United States Patent
Kim et al.

(10) Patent No.: US 12,399,268 B2
(45) Date of Patent: Aug. 26, 2025

(54) METHOD AND DEVICE FOR CARRYING OUT SENSING IN WIRELESS LAN SYSTEM

(71) Applicant: LG Electronics Inc., Seoul (KR)

(72) Inventors: Sanggook Kim, Seoul (KR); Dongguk Lim, Seoul (KR); Insun Jang, Seoul (KR); Jeongki Kim, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 439 days.

(21) Appl. No.: 18/010,646

(22) PCT Filed: Jun. 15, 2021

(86) PCT No.: PCT/KR2021/007471
§ 371 (c)(1),
(2) Date: Dec. 15, 2022

(87) PCT Pub. No.: WO2021/256830
PCT Pub. Date: Dec. 23, 2021

(65) Prior Publication Data
US 2023/0236307 A1  Jul. 27, 2023

Related U.S. Application Data

(60) Provisional application No. 63/140,937, filed on Jan. 24, 2021, provisional application No. 63/081,327, (Continued)

(51) Int. Cl.
*G01S 13/76* (2006.01)
*G01S 7/00* (2006.01)
(Continued)

(52) U.S. Cl.
CPC ............ *G01S 13/765* (2013.01); *G01S 7/006* (2013.01); *G01S 13/003* (2013.01);
(Continued)

(58) Field of Classification Search
None
See application file for complete search history.

(56) References Cited

U.S. PATENT DOCUMENTS 8,437,440 B1 * 5/2013 Zhang ................... H04L 1/0675
375/366
11,943,646 B2 * 3/2024 Lim ........................ G01S 13/87
(Continued)

FOREIGN PATENT DOCUMENTS

WO   WO2018204793   11/2018
WO   WO2020097487    5/2020

OTHER PUBLICATIONS

Silva et al., "A Channel Measurement Procedure for WLAN Sensing," IEEE 802.11-20/0842r0, Jun. 2020, 14 pages.

*Primary Examiner* — Christopher T Wyllie
(74) *Attorney, Agent, or Firm* — Fish & Richardson P.C.

(57) ABSTRACT

In a wireless local area network (LAN) system, a sensing session comprises a first burst and a second burst, wherein, in the first burst, a transmitting STA may transmit a first sounding signal to a first receiving STA and a second receiving STA. In the first burst, the transmitting STA may receive, from the first receiving STA, a first feedback frame comprising first channel information between the transmitting STA and the first receiving STA, and, from the second receiving STA, a second feedback frame comprising channel information between the transmitting STA and the second receiving STA. In the second burst, the transmitting STA may receive a second sounding signal from the first receiving STA. In the second burst, the transmitting STA may receive, from the second receiving STA, a third feedback frame comprising channel information between the first receiving STA and the second receiving STA.

15 Claims, 23 Drawing Sheets

Related U.S. Application Data filed on Sep. 22, 2020, provisional application No. 63/078,877, filed on Sep. 15, 2020, provisional application No. 63/039,427, filed on Jun. 15, 2020.

(51) Int. Cl.
  *G01S 13/00* (2006.01)
  *H04L 5/00* (2006.01)
  *H04W 72/0453* (2023.01)
  *H04W 84/12* (2009.01)

(52) U.S. Cl.
  CPC ....... *H04L 5/0048* (2013.01); *H04W 72/0453* (2013.01); *H04W 84/12* (2013.01)

(56) References Cited

U.S. PATENT DOCUMENTS

| | | | |
|---|---|---|---|
| 2018/0139782 A1* | 5/2018 | Sadek | H04W 74/0808 |
| 2019/0341988 A1* | 11/2019 | Schelstraete | H04B 7/0452 |
| 2020/0059808 A1* | 2/2020 | Lim | H04W 72/04 |
| 2020/0092850 A1* | 3/2020 | Jiang | H04W 72/04 |
| 2020/0169841 A1* | 5/2020 | Das | H04W 24/10 |
| 2020/0359248 A1* | 11/2020 | Sadeghi | H04W 74/0808 |
| 2020/0400778 A1* | 12/2020 | da Silva | H04W 8/005 |
| 2023/0138224 A1* | 5/2023 | Sadeghi | H04W 74/0808 |
| | | | 370/338 |
| 2023/0221428 A1* | 7/2023 | Jang | H04W 76/11 |
| | | | 342/42 |
| 2023/0224695 A1* | 7/2023 | Jang | G01S 13/003 |
| | | | 370/338 |
| 2023/0236307 A1* | 7/2023 | Kim | G01S 7/006 |
| | | | 342/52 |
| 2024/0125915 A1* | 4/2024 | Au | G01S 13/765 |
| 2024/0137813 A1* | 4/2024 | Kim | G01S 13/87 |
| 2024/0236769 A9* | 7/2024 | Kim | H04W 88/02 |
| 2024/0373506 A1* | 11/2024 | Kim | H04W 74/08 |

\* cited by examiner (a)

(b)

METHOD AND DEVICE FOR CARRYING OUT SENSING IN WIRELESS LAN SYSTEM

CROSS-REFERENCE TO RELATED APPLICATIONS

This application is a National Stage application under 35 U.S.C. § 371 of International Application No. PCT/KR2021/007471, filed on Jun. 15, 2021, which claims the benefit of U.S. Provisional Application No. 63/039,427, filed on Jun. 15, 2020, U.S. Provisional Application No. 63/078,877, filed on Sep. 15, 2020, U.S. Provisional Application No. 63/081,327, filed on Sep. 22, 2020, and U.S. Provisional Application No. 63/140,937, filed on Jan. 24, 2021. The disclosures of the prior applications are incorporated by reference in their entirety.

TECHNICAL FIELD

The present disclosure relates to a technique for performing sensing in a WLAN system, and more particularly, to a procedure and signaling method for performing sensing by a sensing initiator and a sensing responder stations (STAs).

BACKGROUND

A wireless local area network (WLAN) has been improved in various ways. For example, IEEE 802.11bf WLAN sensing is the first standard which converges communication and radar technologies. Although there is a rapid increase in a demand for unlicensed frequencies in daily life throughout overall industries, due to a limitation in frequencies to be newly provided, it is very preferable to develop the technology of converging the communication and the radar in terms of increasing frequency utilization efficiency. A sensing technology which detects a movement behind a wall by using a WLAN signal or a radar technology which detects an in-vehicle movement by using a frequency modulated continuous wave (FMCW) signal at a 70 GHz band has been conventionally developed, but it may have significant meaning in that sensing performance can be raised up by one step in association with the IEEE 802.11bf standard. In particular, since privacy protection is increasingly emphasized in modern society, a WLAN sensing technology which is legally freer from invasion of privacy is more expected, unlike CCTV.

Meanwhile, an overall radar market throughout automobiles, national defense, industries, daily life, or the like is expected to grow until an average annual growth rate reaches up to a level of about 5% by 2025. In particular, in case of a sensor used in daily life, it is expected to rapidly grow up to a level of 70%. Since the WLAN sensing technology is applicable to a wide range of daily life such as motion detection, breathing monitoring, positioning/tracking, fall detection, in-vehicle infant detection, appearance/proximity recognition, personal identification, body motion recognition, behavior recognition, or the like, it is expected to contribute to enhancing competitiveness of companies.

SUMMARY

According to various embodiments of a wireless local area network (WLAN) system, a transmitting station (STA) may transmit a first sounding signal to a first receiving STA and a second receiving STA in a first burst, wherein sensing session includes the first burst and a second burst. The transmitting STA may receive a first feedback frame including first channel information between the transmitting STA and the first receiving STA from the first receiving STA in the first burst. The transmitting STA may receive a second feedback frame including channel information between the transmitting STA and the second receiving STA from the second receiving STA. The transmitting STA may receive a second sounding signal from the first receiving STA in the second burst. The transmitting STA may receive a third feedback frame including channel information between the first receiving STA and the second receiving STA from the second receiving STA in the second burst.

According to an example of the present specification, sensing is performed by cooperation of a plurality of devices, and accurate sensing results can be derived through additional information on a channel environment. In addition, by grouping WLAN sensing devices according to needs and situations, more accurate sensing can be performed while obtaining a reduction in overall power consumption. By controlling the granularity of the WLAN sensing responder's channel environment measurement, power consumption according to the measurement can be reduced. By controlling the degree of feedback according to the channel environment of the WLAN sensing responder, power consumption due to feedback can be reduced in an operating environment in which power consumption is a concern.

According to an example of the present specification, given power can be concentrated on measurement and feedback on an allocated bandwidth, enabling operation in a more expanded area. In addition, the sensing area can be enlarged by increasing the transmission power per unit frequency.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B. C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A. B, and C" may mean "only A", "only B", "only C", or "any combination of A, B, and C". In addition. "at least one of A, B, or C" or "at least one of A, B, and/or C" may mean "at least one of A, B, and C".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may also be applied to the newly proposed WLAN sensing standard or IEEE 802.11bf standard.

Hereinafter, in order to describe a technical feature of the present specification, a technical feature applicable to the present specification will be described.

Figure 1:
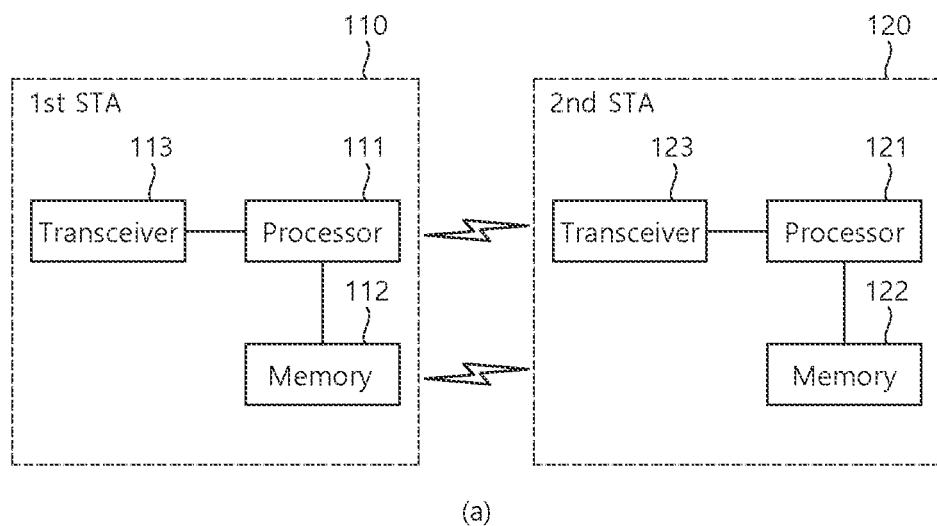
FIG. 1 illustrates an example of a transmitting apparatus and/or receiving apparatus of the present specification.
Figure 1:
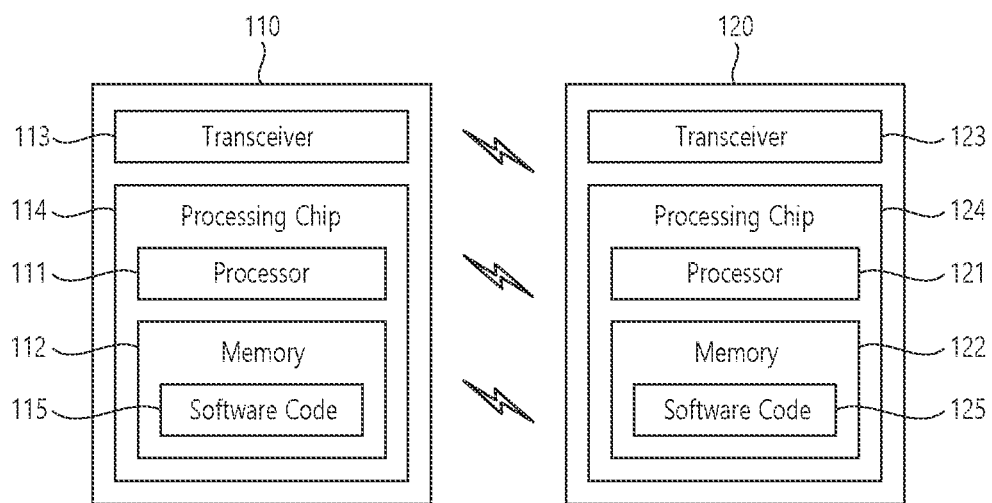

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may mean a link for communication from a non-AP STA to an AP STA, and an uplink PPDU/packet/signal or the like may be transmitted through the uplink. In addition, in the present specification, a downlink may mean a link for communication from the AP STA to the non-AP STA, and a downlink PPDU/packet/signal or the like may be transmitted through the downlink.

A WLAN sensing technology is a sort of radar technologies which can be implemented without a standard, but it is conceived that more powerful performance can be obtained through standardization. The IEEE 802.11bf standard defines an apparatus participating in wireless LAN sensing for each function as shown in the following table. According to the function thereof, the apparatus may be classified into an apparatus initiating WLAN sensing and an apparatus participating in the sensing, an apparatus transmitting a sensing physical layer protocol data unit (PPDU) and an apparatus receiving the PPDU.

TABLE 1

| Terminology | Function |
| --- | --- |
| Sensing Initiator | apparatus initiating sensing |
| Sensing Responder | apparatus participating in sensing |
| Sensing Transmitter | apparatus transmitting sensing PPDU |
| Sensing Receiver | apparatus receiving sensing PPDU |

Figure 2:
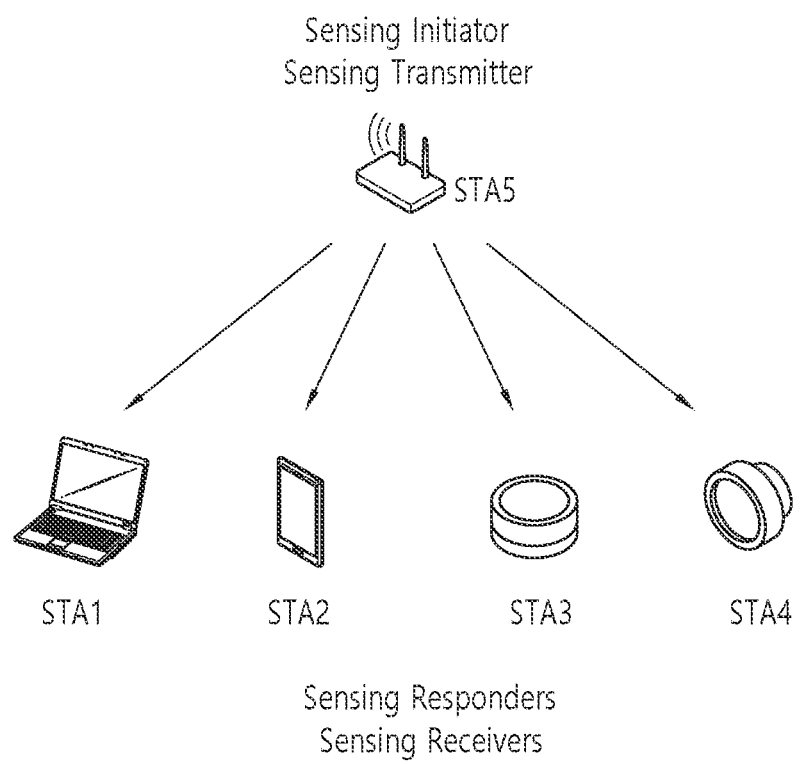
FIG. 2 illustrates an example of a WLAN sensing scenario using multiple sensing transmitting apparatuses.
Figure 3:
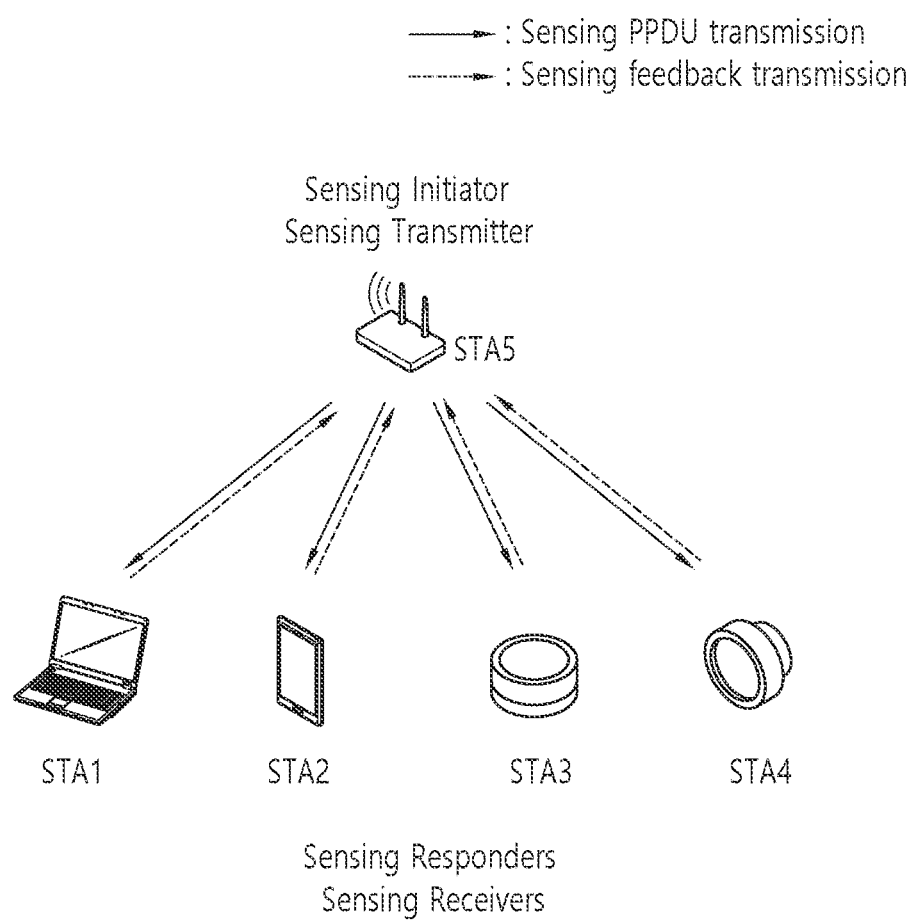
FIG. 3 illustrates an example of a WLAN sensing scenario using multiple sensing receiving apparatuses.
Figure 4:
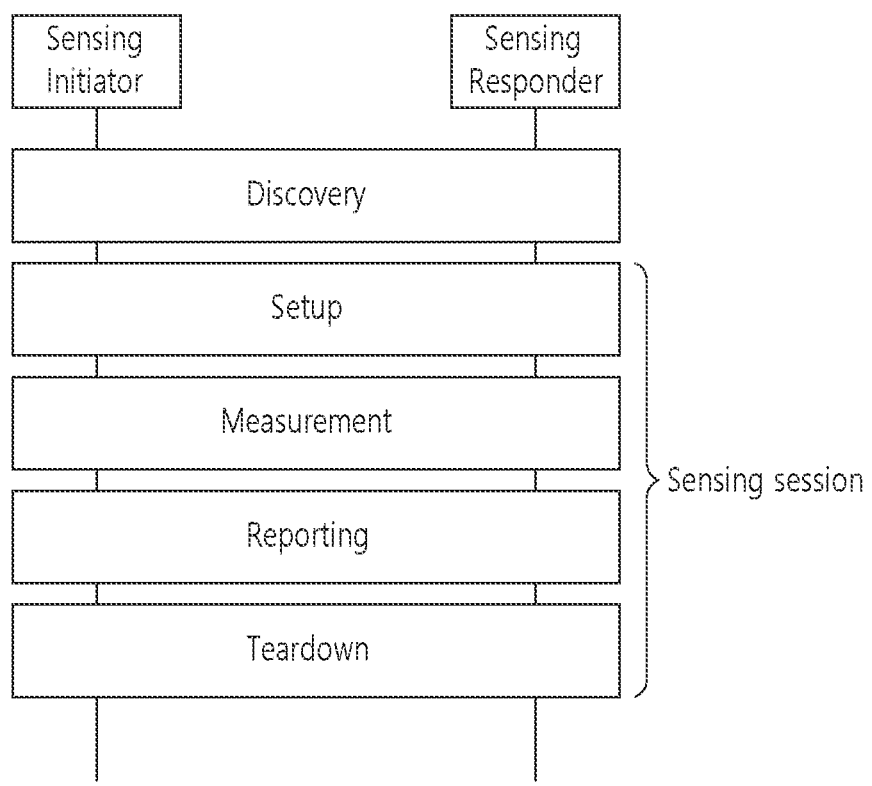
FIG. 4 illustrates an example of a WLAN sensing procedure.

In addition, in the present disclosure, if an entity transmitting a signal for WLAN sensing is an initiator, it is defined as initiator-based sensing, and if the subject of signal transmission is a responder, it is defined as responder-based sensing. FIG. 2 illustrates an example of a WLAN sensing scenario using multiple sensing transmitting apparatuses. FIG. 3 illustrates an example of a WLAN sensing scenario using multiple sensing receiving apparatuses. FIG. 2 and FIG. 3 illustrate a sensing scenario based on a function and deployment of a WLAN sensing apparatus. In an environment assuming one sensing initiation apparatus and multiple sensing participating apparatuses, FIG. 2 is a scenario using multiple sensing PPDU transmitting apparatuses, and FIG. 3 is a scenario using multiple sensing PPDU receiving apparatuses. Assuming that the sensing PPDU receiving apparatus includes a sensing measurement signal processing apparatus, in case of FIG. 3, a procedure for transmitting (feeding back) a sensing measurement result to the sensing initiation apparatus (STA 5) is additionally required. A procedure of WLAN sensing is performed as discovery, negotiation, measurement exchange, tear down, or the like between WLAN sensing initiation apparatus and participating apparatuses. The discovery is a process of identifying sensing capability of WLAN apparatuses. The negotiation is a process of determining a sensing parameter between the sensing initiation apparatus and participating apparatus. The measurement exchange is a process of transmitting a sensing PPDU and transmitting a sensing measurement result. The tear down is a process of terminating the sensing procedure.

Figure 5:
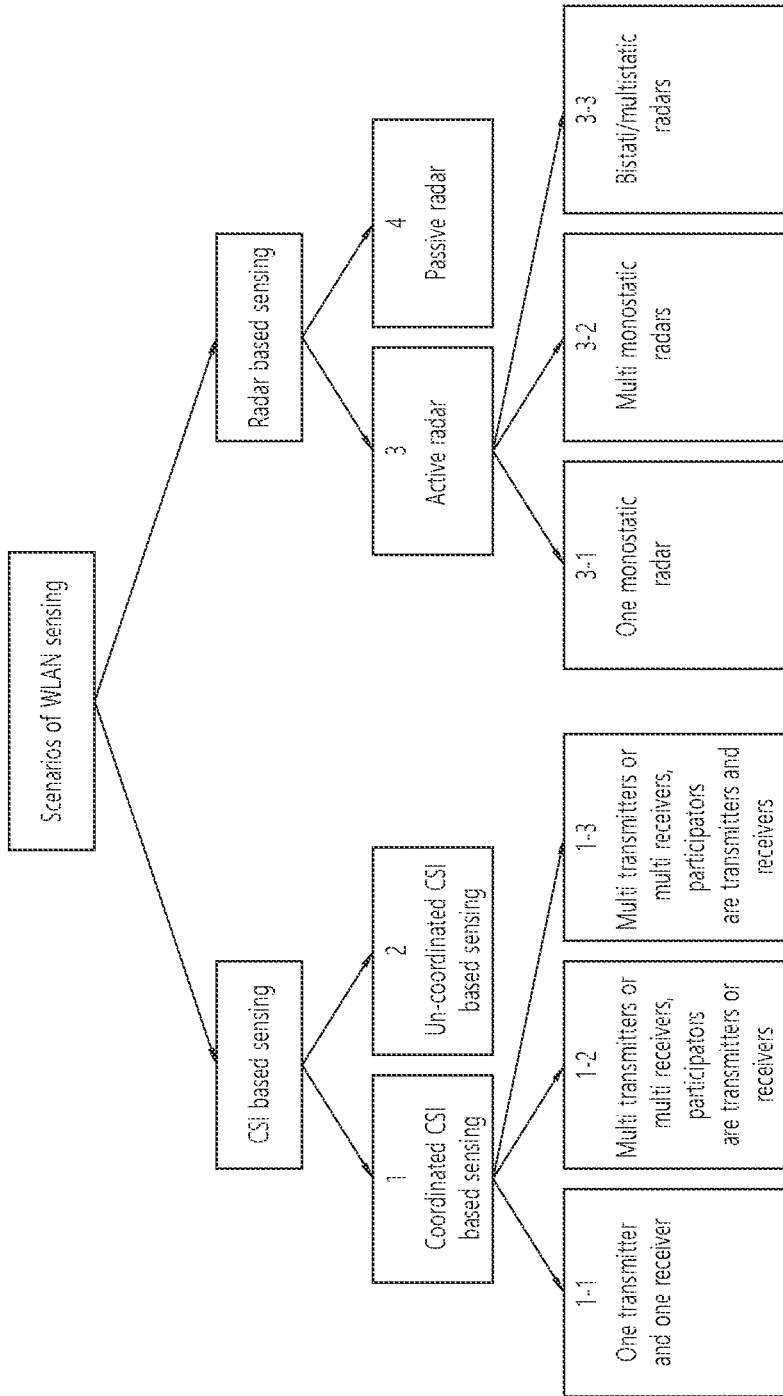
FIG. 5 is an example of classifying WLAN sensing.

FIG. 5 is an example of classifying WLAN sensing.

The WLAN sensing may be classified into CSI-based sensing which uses channel state information of a signal arrived at a receiver through a channel and radar-based sensing which uses a signal received after a transmission signal is reflected by an object. In addition, each sensing technology is classified again into a scheme (a coordinated CSI, active radar) in which a sensing transmitter directly participates in a sensing process and a scheme (un-coordinated CSI, passive radar) in which the sensing transmitter does not participate in the sensing process, i.e., there is no dedicated transmitter participating in the sensing process.

Figure 6:
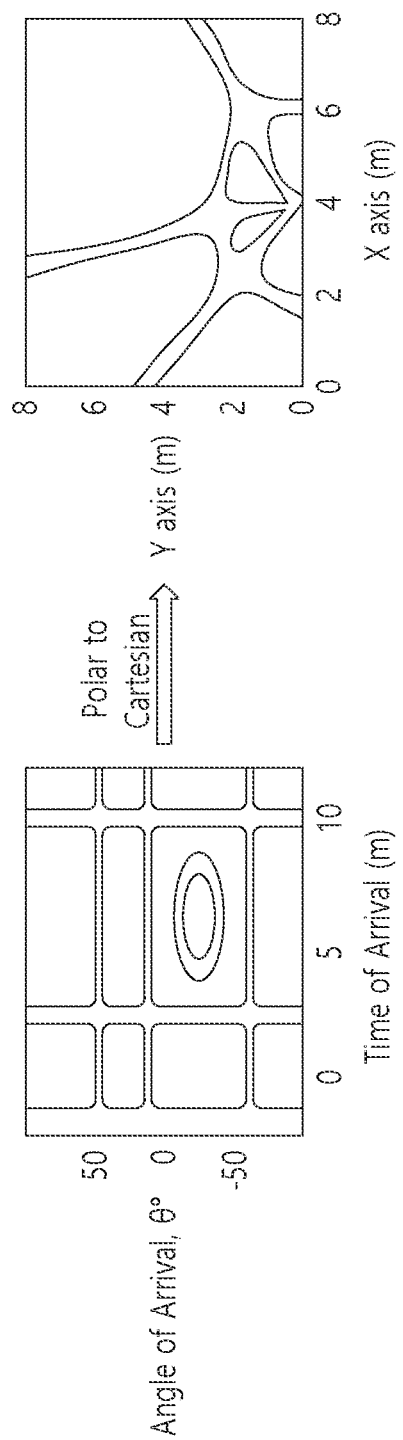
FIG. 6 illustrates indoor positioning which uses CSI-based WLAN sensing.

FIG. 6 illustrates indoor positioning which uses CSI-based WLAN sensing.

In FIG. 6, the CSI-based WLAN sensing is utilized in the indoor positioning. An angle of arrival and a time of arrival are obtained by using CSI, and then are converted into an orthogonal coordinate to obtain indoor positioning information.

Figure 7:
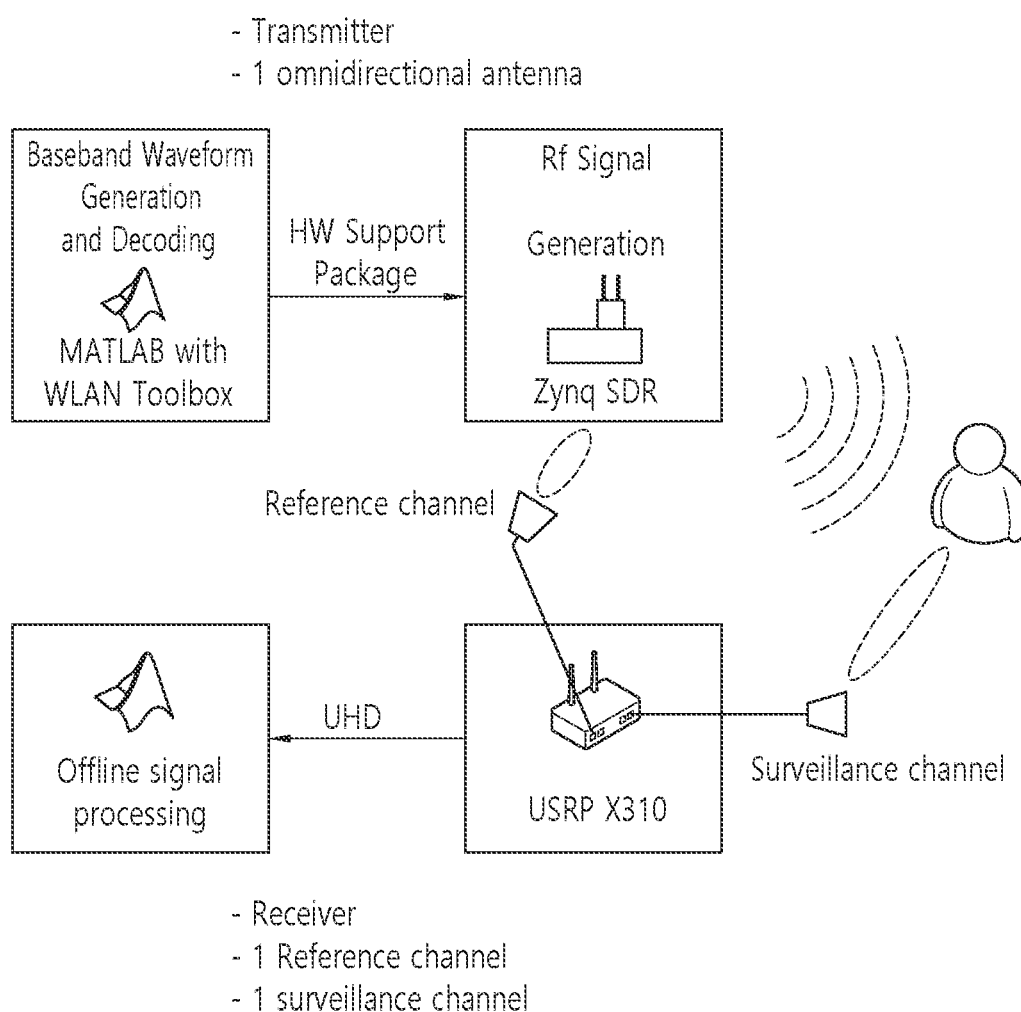
FIG. 7 is an example of implementing a WLAN sensing apparatus.

FIG. 7 is an example of implementing a WLAN sensing apparatus.

In FIG. 7, the WLAN sensing apparatus is implemented using a MATLAB toolbox, Zynq, and USRP. An IEEE 802.1 lax WLAN signal is generated in the MATLAB toolbox, and an RF signal is generated using a Zynq software defined radio (SDR). A signal passing through a channel is received using a USRP SDR, and sensing signal processing is performed in the MATLAB toolbox. Herein, one reference channel (a channel which can be directly received from a sensing transmitter) and one surveillance channel (a channel which can be received by being reflected by an object) are assumed. As a result of analysis using the WLAN sensing apparatus, it is possible to obtain a unique feature capable of identifying a motion or a body action.

The IEEE 802.11bf WLAN sensing standardization is in an initial stage of development at present, and it is expected that a cooperative sensing technology for improving sensing accuracy will be treated to be important in the future. It is expected that a synchronization technology of a sensing signal for cooperative sensing, a CSI management and usage technology, a sensing parameter negotiation and sharing technology, a scheduling technology for CSI generation, or the like will be a core subject for standardization. In addition, it is also expected that a long-distance sensing technology, a low-power sensing technology, a sensing security and privacy protection technology, or the like will be reviewed as a main agenda.

IEEE 802.11bf WLAN sensing is a sort of radar technologies using a WLAN signal which exists anywhere anytime. The following table shows a typical case of using IEEE 802.11bf, which may be utilized in a wide range of daily life such as indoor detection, motion recognition, health care, 3D vision, in-vehicle detection, or the like. Since it is mainly used indoors, an operating range is usually within 10 to 20 meters, and distance accuracy does not exceed up to 2 meters.

TABLE 2

| Name | details | Max range (m) | Key Performance Indicator | Range Accuracy (m) | Max Velocity (m/s)/Velocity Accuracy | angular Accuracy (deg) |
|---|---|---|---|---|---|---|
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/gesture detection | 10 | Gesture Detection | <1 | | |
| Gesture recognition - short range (finger movement) | Identification of a gesture from a set of gestures - range <0.5 m | 0.5 | Gesture Detection | | 7 | 3 |
| Gesture recognition - medium range (hand movement) | Indentification of a gesture from a set of gestures - range >0.5 m | 2 | Gesture Detection | | | |
| Gesture recognition - large range (full body movement) | Indentification of a gesture from a set of gestures - range >2 m | 7 | Gesture Detection | 0.2 | 2/0.1 | 5 |
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, heart rate etc. | 5 | Breathing rate accuracy/Pulse Accuracy | 0.5 | 2/0.1 | |
| Surveillance/Monitoring of elder people and/or children | Tracking person and presence detection | 10 | Detection and localization of person | 0.2-2 | 3/0.1 | |
| Sneeze sensing | Detecting and localizing the target human | 10 | Detection and localization of person | 0.2-0.5 | 20/0.1 | |

TABLE 2-continued

| Name | details | Max range (m) | Key Performance Indicator | Range Accuracy (m) | Max Velocity (m/s)/Velocity Accuracy | angular Accuracy (deg) |
|---|---|---|---|---|---|---|
| 3d vision | and sneeze droplet volume building a 3d picture of an environment, using multiple STA | 10 | and sneeze droplet volume accuracy of 3d map (range, angle) | 0.01 | 5/0.1 | 2 |
| In car sensing - detection | detection of humans in car | 5 | Presence of Human in car | 0.1 | 1/0.1 | 3 |
| In car sensing | Driver sleepiness detection/ detection aid | 3 | Fast detection of driver sleepiness | 0.01 | 1/0.1 | 3 |

Figure 8:
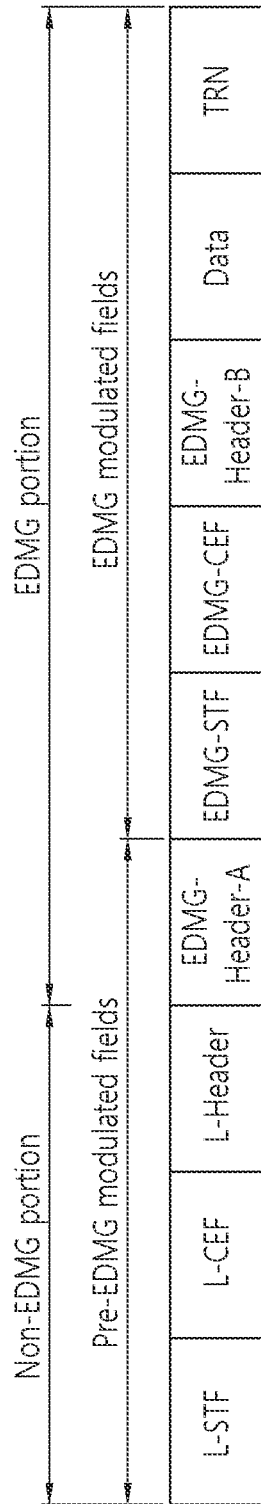
FIG. 8 briefly illustrates a PPDU structure supported in an 802.11ay WLAN system.

In IEEE 802.11, there is ongoing discussion on a technology for sensing a motion or gesture of an object (person or thing) using a Wi-Fi signal of 60 GHz (e.g., 802.11ad or 802.1 lay signal). The present specification proposes a method of configuring a frame format used for Wi-Fi sensing and a Wi-Fi sensing sequence. FIG. 8 briefly illustrates a PPDU structure supported in an 802.11ay WLAN system. As shown in FIG. 8, the PPDU format applicable to the 11ay system may include L-STF, L-CEF, L-Header, EDMG-Header-A, EDMG-STF, EDMG-CEF, EDMG-Header-B, Data, and TRN fields, and the aforementioned fields may be selectively included in accordance with the format of the PPDU (e.g., SU PPDU, MU PPDU, etc.). Herein, a portion including the L-STF, L-CEF, and L-header fields may be referred to as a non-EDMG portion, and the remaining portion may be referred to as an EDMG portion. Additionally, the L-STF, L-CEF, L-Header, and EDMG-Header-A fields may be referred to as pre-EDMG modulated fields, and the remaining portions may be referred to as EDMG modulated fields. The EDMG-Header-A field includes information required to demodulate an EDMG PPDU. The definition of the EDMG-Header-A field is the same as those of the EDMG SC mode PPDU and the EDMG OFDM mode PPDU, but is different from the definition of the EDMG control mode PPDU.

A structure of EDMG-STF depends on the number of consecutive 2.16 GHz channels through which the EDMG PPDU is transmitted and an index isms of an $i_{STS}$-th space-time stream. For single space-time stream EDMG PPDU transmission using an EDMG SC mode through one 2.16 GHz channel, an EDMG-STF field does not exist. For EDMG SC transmission, the EDMG-STF field shall be modulated using pi/(2-BPSK).

A (legacy) preamble part of the PPDU may be used for packet detection, automatic gain control (AGC), frequency offset estimation, synchronization, indication of modulation (SC or OFDM) and channel estimation. A format of the preamble may be common to both an OFDM packet and an SC packet. In this case, the preamble may be constructed of a short training field (STF) and a channel estimation (CE) field located after the STF field.

Figure 9:
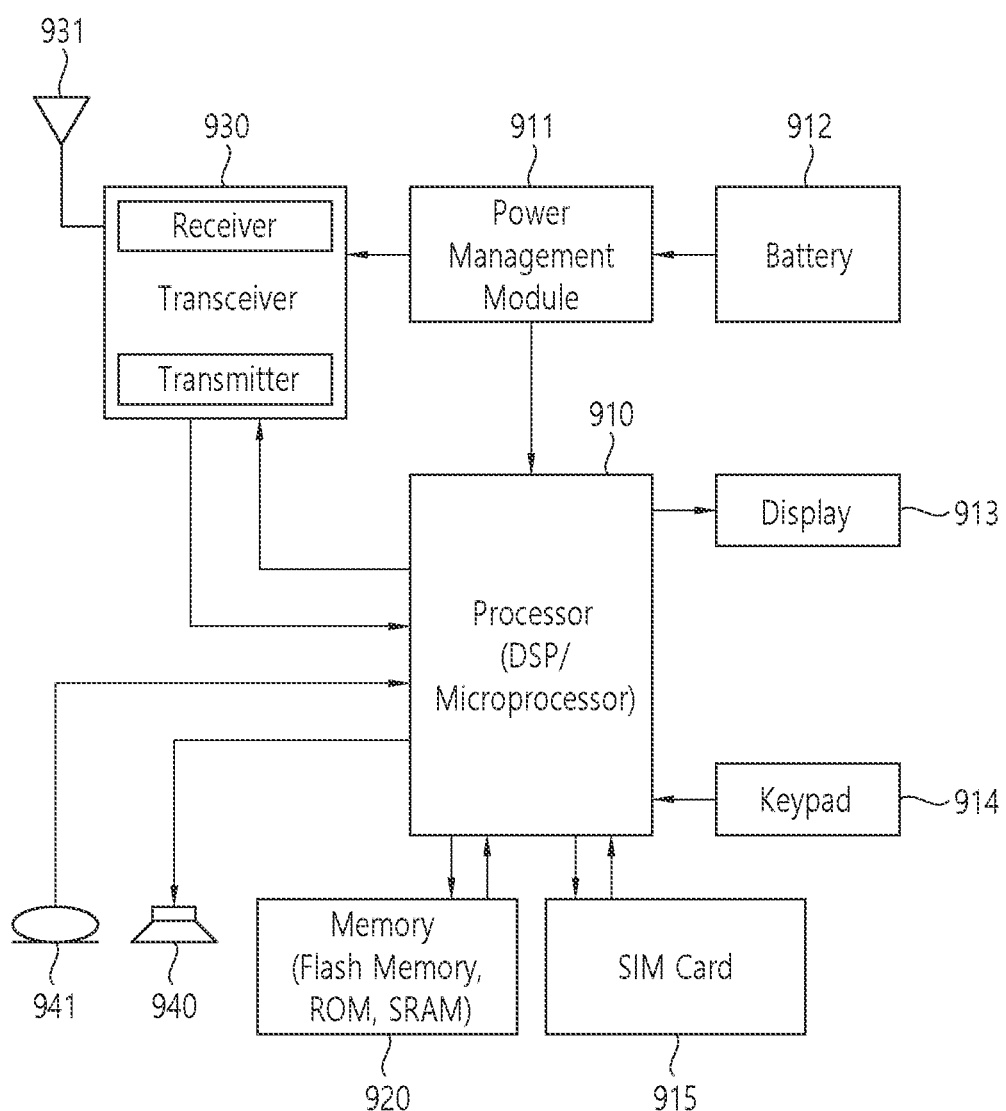
FIG. 9 illustrates an example of a PPDU used in the present specification.

FIG. 9 illustrates an example of a modified transmitting apparatus and/or receiving apparatus of the present specification.

Each apparatus/STA of the sub-figure (a)/(b) of FIG. 1 may be modified as shown in FIG. 9. A transceiver 930 of FIG. 9 may be identical to the transceivers 113 and 123 of FIG. 1. The transceiver 930 of FIG. 9 may include a receiver and a transmitter.

A processor 910 of FIG. 9 may be identical to the processors 111 and 121 of FIG. 1. Alternatively, the processor 910 of FIG. 9 may be identical to the processing chips 114 and 124 of FIG. 1.

A memory 920 of FIG. 9 may be identical to the memories 112 and 122 of FIG. 1. Alternatively, the memory 920 of FIG. 9 may be a separate external memory different from the memories 112 and 122 of FIG. 1.

Referring to FIG. 9, a power management module 911 manages power for the processor 910 and/or the transceiver 930. A battery 912 supplies power to the power management module 911. A display 913 outputs a result processed by the processor 910. A keypad 914 receives inputs to be used by the processor 910. The keypad 914 may be displayed on the display 913. A SIM card 915 may be an integrated circuit which is used to securely store an international mobile subscriber identity (IMSI) and its related key, which are used to identify and authenticate subscribers on mobile telephony apparatuses such as mobile phones and computers.

Referring to FIG. 9, a speaker 940 may output a result related to a sound processed by the processor 910. A microphone 941 may receive an input related to a sound to be used by the processor 910.

In IEEE802.11bf, an 802.11ad and 802.11ay signal transmitting/receiving method which is a 60 GHz Wi-Fi technology is considered to sense a motion or gesture of a STA or person by using a 60 GHz Wi-Fi signal. For effective Wi-Fi sensing, the present specification proposes a method of configuring a sensing initiation frame, a transmission initiation frame, and a sensing signal, and a sensing sequence for transmitting/receiving the sensing initiation frame, the transmission initiation frame, and the sensing signal.

A STA described in the following description may be the apparatus of FIG. 1 and/or FIG. 9, and a PPDU may be the PPDU of FIG. 7. A device may be an AP or a non-AP STA.

A wireless local area network (WLAN) has been introduced for the purpose of short-distance data transmission using an unlicensed band. An IEEE 802.11 MAC/PHY-based WLAN (e.g. Wi-Fi) has become a representative technology which is at present deployed almost everywhere.

The WLAN (e.g., Wi-Fi) has been designed for data signal transmission, but a usage thereof has recently been extended for other purposes than data transmission.

A WLAN (e.g., Wi-Fi) signal transmitted from a transmitting end and delivered to a receiving end may include information on a transmission channel environment between both the transmitting and receiving ends. WLAN sensing refers to a technology which obtains recognition information for various surrounding environments by processing the transmission channel information obtained through the WLAN signal.

For example, cognitive information may include information obtained through a technology such as gesture recognition, fall detection by elder people, intrusion detection, human motion detection, health monitoring, pet movement detection, or the like.

An additional service may be provided through the recognition information, and WLAN sensing may be applied and used in various forms in daily life. As a method for increasing accuracy of WLAN sensing, devices having at least one WLAN sensing function may be used in the WLAN sensing. The WLAN sensing using the plurality of devices may use multiple pieces of information for a channel environment, and thus may obtain more accurate sensing information, compared to a method of using one device (e.g. a transmitting/receiving end).

WLAN (e.g., Wi-Fi) transmission is performed in a broadband using channel aggregation, channel bonding, and the like. In addition, WLAN transmission in a more extended broadband is being discussed.

For example, a WLAN transmission may have the following bandwidth:
20/40/80/80+80/160 MHz (802.11 ac/ax)
20/40/80+80/160/160+80/240/160+160/320 MHz (802.11 TGbe)

Transmission using broadband has the advantage of obtaining detailed information about the channel environment, but excessive power consumption may occur due to sensing of the wideband channel environment and transmission of a lot of information resulting therefrom. In particular, the operation of a WLAN sensing device using a battery may have a significant effect on power consumption.

In addition, there is a possibility that there is a diversity of supported bands and bandwidths of products equipped with WLAN (e.g., Wi-Fi) transmission and reception functions. For example, the supported bands may be different, such as 2.4 GHz/2.4 GHz+5 GHz/5 GHz/6 GHz/5 GHz+6 GHz/2.4 GHz+5 GHz+6 GHz. For example, in the case of supported bandwidth, when operating in a 6 GHz band, the maximum bandwidth supported by devices may be different, such as 40 MHz, 80 MHz, 160 MHz, 240 MHz, 320 MHz, and the like.

Hereinafter, a method for enabling broadband operation while reducing power consumption is proposed by using one or more WLAN sensing devices in an environment with different characteristics such as supported band and bandwidth.

By grouping and operating devices with WLAN sensing function according to specific area (region), device capability, etc., overall power reduction and more detailed sensing can be performed.

In the present specification, a method of grouping one or more WLAN sensing devices and sequentially performing sensing of up to a certain number of devices in the group (or including all devices) is proposed. Through this, a method of enabling broadband operation while obtaining more detailed sensing information and reducing power consumption is proposed.

Sensing Session: This denotes a period during which transmission and reception of signals for sensing can proceed. The sensing session can be assigned periodically or as needed. Sensing session can consist of multiple sub-sessions. In this specification, a sub-session may be referred to as a "sensing burst".

WLAN Sensing Initiator: This denotes a station (STA) that instructs devices having one or more sensing functions (i.e., WLAN Sensing responder) to initiate a sensing session using a WLAN signal. The WLAN Sensing initiator may send a signal for sensing (e.g., NDP) or may request signal transmission for sensing from other STAs. That is, the initiator may be a transmitter or a receiver.

WLAN Sensing Responder: This denotes a STA that can participate in WLAN Sensing at the instruction of the WLAN Sensing initiator and perform the instructed sensing, deliver a signal to the initiator, or transmit a signal for sensing at the instruction of the initiator.

WLAN Sensing Transmitter: This denotes a STA that transmits signals for WLAN sensing during a sensing session (or burst). When a sensing session is composed of a plurality of sensing bursts, the sensing transmitter may be the same in all bursts, different in some bursts, or different for each burst.

WLAN Sensing Receiver: This denotes a STA that receives signals for WLAN sensing during a sensing session (or burst). When a sensing session is composed of multiple sensing bursts, the sensing receiver can be the same in all bursts, different in some bursts, or different for each burst.

Within a sensing session, the WLAN initiator can play the role of a WLAN sensing transmitter ("initiator-based sensing") or a WLAN sensing receiver ("responder-based sensing").

Within a sensing session, a WLAN responder can play the role of a WLAN sensing transmitter ("responder-based sensing") or a WLAN sensing receiver ("initiator-based sensing").

WLAN Sensing Group: A set of devices that have one or more WLAN sensing capabilities. Each group can have a group owner, and the owner can act as a sensing initiator. If a Sensing Agent is located in the Group Owner (GO), the Group Owner can collect and analyze channel information from one or more STAs (responders) obtained per Sensing Session. When the group owner does not have a sensing agent, the group owner can deliver the group's measurement results to the entity where the sensing agent is located. In this specification, this entity may be referred to as "Central Entity".

The central entity can be an AP or another entity located in the cloud.

A WLAN sensing group member may refer to other STAs other than the group owner (GO).

When the WLAN sensing group owner is not a central entity, initiator information may be static or changed in an ongoing WLAN sensing session. For example, initiator information may be changed after a certain number of sessions have been performed or for each session.

During the sensing burst, sensing signal transmission by the transmitter and feedback transmission by the receiver can be performed.

During the sensing burst, only the sensing signal can be transmitted by the transmitter.

Bursts configuring a sensing session can be defined continuously or discontinuously in time. When defined discontinuously, it can be defined identically or similarly to TXOP.

Explicit sensing may include a process of transmitting a sensing signal by a transmitter and transmitting a feedback frame by a receiver.

Implicit sensing extracts information using sensing signal transmission by the transmitter, so the process of feedback can be omitted. That is, since the initiator can receive a sensing signal from the responder and directly obtain channel state information through the received sensing signal, there is no need to receive a feedback frame from the responder.

A transmitter may refer to an STA that transmits a sensing signal (e.g., an NDP frame).

Explicit sensing is a case in which the transmitter is a subject that obtains channel state information, and is a method in which the transmitter transmits a sensing signal and receives a feedback frame from a responder to obtain channel state information.

Implicit sensing is a case in which the receiver is an entity obtaining channel state information. In the implicit sensing, the transmitter transmits a sensing signal, and the receiver can directly obtain channel state information based on the sensing signal received from the transmitter.

Figure 10:
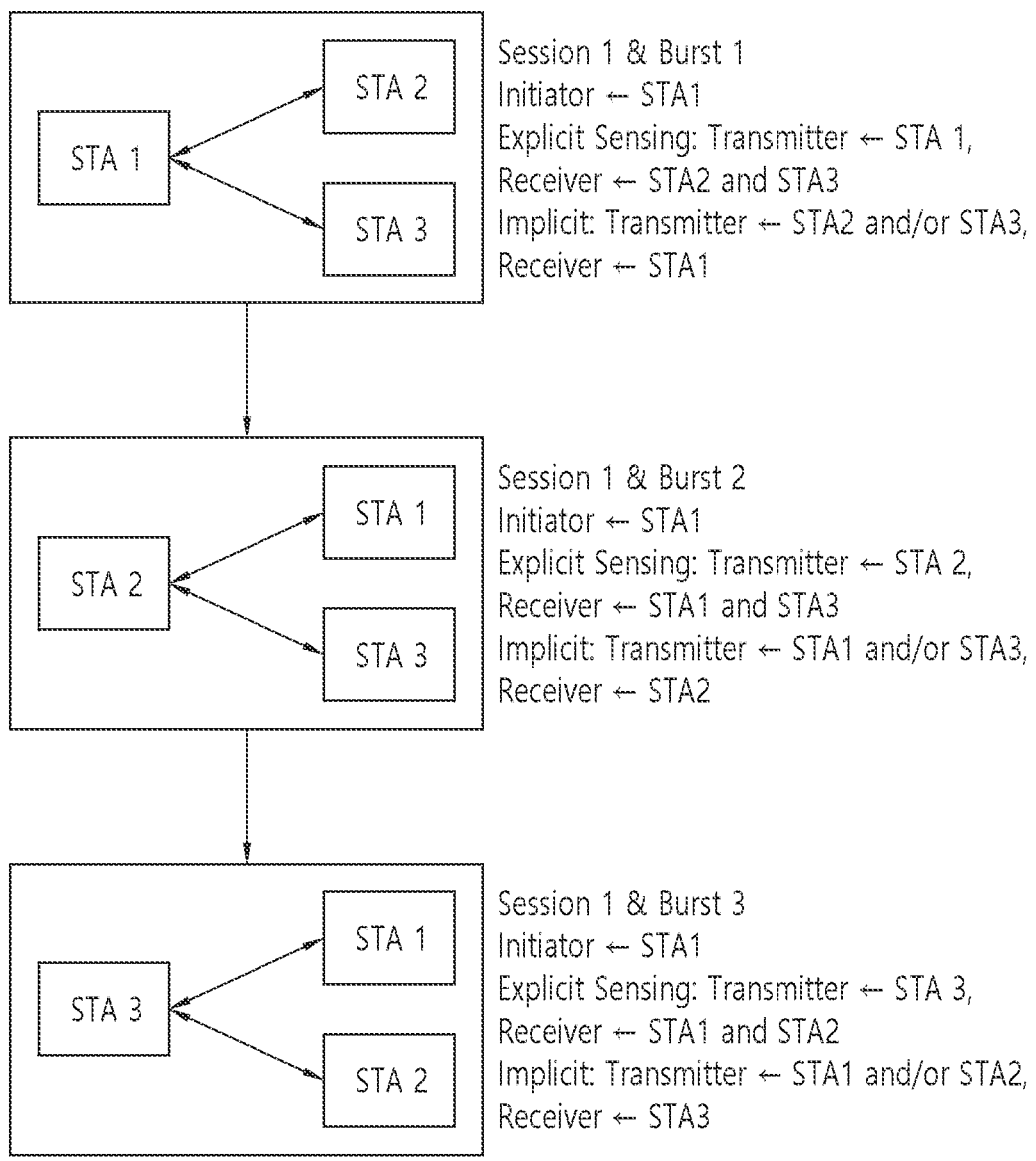
FIG. 10 is a diagram illustrating an embodiment of a connection form of WLAN sensing devices (stations).

FIG. 10 is a diagram explaining a role during three Sensing Bursts through three STAs.

Referring to FIG. 10, one sensing session may consist of three sensing bursts. Here, the transmitter may mean a terminal (i.e., an STA) that transmits a sensing frame (e.g., an NDP frame).

For example, in Burst1 of the sensing session, the initiator may be STA1. For example, in the case of explicit sensing, a transmitter, that is, an STA transmitting a sensing signal (e.g., NDP) may be STA1. In the case of explicit sensing, receivers, that is, STAs receiving a sensing signal (e.g., NDP) may be STA2 and STA3. For example, in the case of implicit sensing, a transmitter, that is, an STA that transmits a sensing signal, may be STA2 and/or STA3. In the case of implicit sensing, the receiver, that is, the STA receiving the sensing signal may be STA1.

For example, in Burst2 of the sensing session, the initiator may be STA1. For example, in the case of explicit sensing, a transmitter, that is, an STA transmitting a sensing signal (e.g., NDP) may be STA2. In the case of explicit sensing, receivers, that is, STAs receiving a sensing signal (e.g., NDP) may be STA1 and STA3. For example, in the case of implicit sensing, a transmitter, that is, an STA that transmits a sensing signal, may be STA1 and/or STA3. In the case of implicit sensing, the receiver, that is, the STA receiving the sensing signal may be STA2.

For example, in Burst3 of the sensing session, the initiator may be STA1. For example, in the case of Explicit Sensing, a transmitter, that is, an STA that transmits a sensing signal (e.g., NDP) may be STA3. In the case of explicit sensing, receivers, that is, STAs receiving a sensing signal (e.g., NDP) may be STA1 and STA2. For example, in the case of implicit sensing, a transmitter, that is, an STA that transmits a sensing signal, may be STA1 and/or STA2. In the case of implicit sensing, the receiver, that is, the STA receiving the sensing signal may be STA3.

Phase 1: Group Formation State/Setup State

When there is one or more devices with WLAN sensing capability, a central entity (e.g., an access point (AP)) may group devices according to specific conditions and transmit information about them using a beacon, trigger frame, or other frame. This group formation step can be performed as part of the Setup step or independently of the Setup step. The group formation step may proceed to a step of confirming each STA's intention to participate as a responder in the group one by one by the initiator. Alternatively, it may proceed to a step of simultaneously confirming to one or more STAs by the initiator. Alternatively, a certain amount of time may be presented to the initiator, and may be performed targeting STAs that have transmitted responses during that time.

For example, in the case of Home Security, monitoring can be performed by grouping peripheral devices such as windows that are vulnerable to intrusion. The group information may include information about the owner of the group, an identifier representing the group, and contents related to a sensing session to be conducted by the group.

When a sensing session is conducted periodic, group information may include information about the period. In addition, the group information may include information about the start time and end time of the sensing session. Group information may include information on sensing bursts (For example, the number of sensing bursts defined in one sensing session, the number of sensing signals that can be transmitted within a sensing burst, the duration and period of signals transmitted within a sensing burst, etc.) within a sensing session. The number of sensing bursts may be equal to or less than the number of devices in the group. Group information may be delivered by an initiator in each sensing burst.

During the sensing session, the transmitter may contend to secure a transmission channel for sensing. For example, in order to alleviate channel securing contention between multiple devices (or resulting OTA overhead), channel securing and initiation procedures (initiation/trigger frame transmission or TXOP securing, etc.) can be performed only by the transmitter of each sensing burst. In addition, the central entity can transmit a signal that allows only the transmitter to perform channel securing and initiation procedures to the group owner. In addition, an indicator that enables/disables the operation of a mode in which only the transmitter performs channel securing and initiation procedures can be defined and used. For example, channel securing contention may proceed through exchange of control frames (e.g., RTS/CTS, etc.).

Initiators can also contend to secure a transmission channel for sensing during a sensing session.

Qualifications of a responder during a sensing session can be specified in advance according to the characteristics of applications and devices. That is, an STA capable of operating as a responder in a sensing session may be determined before initiating the sensing session. For example, in the case of Home Security that includes a refrigerator and a TV, a simple sensor with a WLAN (e.g., Wi-Fi) transmission/reception function attached around a window can operate only as a responder during a sensing session. For example, refrigerators and TVs receiving fixed power may operate as initiators or responders during a sensing session.

After the sensing session, the group owner can collect sensing information and conduct a comprehensive analysis.

For example, if the group owner is a central entity (e.g., AP), the group owner may collect information from group members, STAs (i.e., responders), and then analyze the collected information. For example, in the case of initiator-based sensing, a group owner can receive feedback from responders. For example, in the case of responder-based sensing, a group owner can receive sensing signals from responders.

For example, if the group owner is not a central entity (e.g., AP), the group owner may collect information from STAs (i.e., responders), which are group members, and then transfer the corresponding information to the central entity.

Phase 2-1: Sounding Stage (Initiator-Based Sensing)

Each sensing session may be initiated by a group owner who obtains a channel use opportunity (e.g., transmission opportunity (TXOP)) through channel access contention. In this case, the group owner becomes the initiator. The WLAN sensing initiator may transmit a sensing initiation frame notifying the initiation of a sensing session. The sensing initiation frame may be, for example, a trigger frame. The sensing initiation frame may include channel information of a wideband width to be used for sensing, measurement granularity information for feedback of sensing information, the number of basic bandwidths to be considered for feedback, and information about basic bandwidth allocated to each WLAN sensing responder. When the aforementioned group information is absent in the Beacon frame, the group information may be included in the sensing initiation frame.

For example, if the wideband width to be measured is 80 MHz, the basic bandwidth is 20 MHz, and the measurement granularity is 4 subcarriers, STA1 which is a sensing initiator may allocate first and third 20 MHz base bands among 80 MHz to STA2, and second and fourth 20 MHz base bands to STA3.

In this case. STA2, a WLAN sensing responder, may measure the channel environment of two bands (i.e., the first and third bands) of the allocated 20 MHz unit among the 80 MHz broadband width, and may transmit channel state information obtained by measuring 4 subcarriers as a unit for each 20 MHz bandwidth as feedback.

In the absence of information on the basic bandwidth allocated to responders, the responders can list in order of the best channel environment, measure the channel state information for the two 20 MHz bands with the best channel environment as a unit of four subcarriers, and transmit the channel state information as feedback. That is, if allocation information for feeding back channel state information for a certain 20 MHz band among certain 80 MHz bands to the Responder is not transmitted, the responder may transmit a feedback frame including channel state information on two 20 MHz bands having the best channel state among 80 MHz bands. In this case, instruction information to use two 20 MHz channels may be included in the start information (i.e., the sensing initiation frame).

An existing frame (e.g., Null Data Packet Announcement (NDPA) or Trigger frame) or a new frame may be used as the sensing initiation frame notifying the initiation of the WLAN sensing session. In this case, the NDPA/Trigger frame or the new frame may include an indicator indicating that the purpose is WLAN sensing.

The sensing initiation frame may include transmission related parameter information (e.g., MCS, number of spatial streams (if MIMO), TX Power, etc.).

The sensing initiation frame may be transmitted by the sensing transmitter in every sensing burst. The sensing initiation frame may be transmitted by the sensing initiator in every sensing burst. A sensing initiation frame may be transmitted by a sensing initiator at the initiation of a sensing session.

A WLAN sensing transmitter can transmit a sounding signal using a wide bandwidth. The sounding signal may be transmitted using an existing NDP (Null Data Packet) or may be a newly designed frame or packet.

For more accurate channel environment estimation, one or more NDPs may be transmitted using a given time interval. For example, the time interval may be Short Inter-Frame Space (SIFS).

The time interval between sensing bursts may be SIFS (Short Inter-Frame Space), and other time intervals may be used. When other time intervals are used, a method for preventing use of the channel by other STAs (e.g., OBSS STAs) not participating in sensing may be used. For example, transmission of a control frame (e.g., CTS-to-itself, etc.) by an STA serving as a transmitter of a previous burst may be performed before the initiation of a new burst. For example, a control frame by a session initiator (group owner) may be transmitted before initiating a new burst.

Phase 2-2: Sounding Stage (Responder-Based Sensing)

Each sensing session may be initiated by a group owner who obtains a channel use opportunity (e.g., transmission opportunity (TXOP)) through channel access contention. In this case, the group owner becomes the initiator. The WLAN sensing initiator may transmit a sensing initiation frame notifying the initiation of a sensing session. The sensing initiation frame may include information to be used for transmission by other STAs (i.e., responder STA(s)) that will serve as a sensing transmitter. For example, the sensing initiation frame may include channel information of a wide bandwidth, information of a basic bandwidth unit to be used by each STA for transmission, and the like. When the aforementioned group information is absent in the Beacon frame, the group information may be included in the sensing initiation frame.

For example, the sensing initiation frame may include information about a basic bandwidth of transmission performed by each WLAN sensing responder (i.e., transmitter). For example, if the wideband width to be measured by the WLAN initiator (i.e., receiver) is 80 MHz, the basic bandwidth is 20 MHz, and the measurement granularity is 4 subcarriers, STA 1, which is a sensing initiator, may allocate first and third 20 MHz base bands among 80 MHz to STA2, and second and fourth 20 MHz base bands to STA3.

For example, STA2, which is a WLAN sensing responder, may transmit a signal (i.e., a sounding signal) for measuring a channel environment of two allocated 20 MHz band widths among 80 MHz broadband widths when performing the role of a transmitter.

An existing frame (e.g., Null Data Packet Announcement (NDPA) or Trigger frame) or a new frame may be used as the sensing initiation frame notifying the initiation of the WLAN sensing session. In this case, the NDPA/Trigger frame or the new frame may include an indicator indicating that the purpose is WLAN sensing.

The sensing initiation frame may include transmission related parameter information (e.g., MCS, number of spatial streams (if MIMO), TX Power, etc.).

The sensing initiation frame may be transmitted by the sensing transmitter in every sensing burst. The sensing initiation frame may be transmitted by the sensing initiator in every sensing burst. A sensing initiation frame may be transmitted by a sensing initiator at the initiation of a sensing session.

During a sensing session, STAs acting as sensing responders may transmit sounding signals using an allocated or full bandwidth during a sensing burst designated by group information. The sounding signal may include a Null Data Packet (NDP) frame.

For more accurate channel environment estimation, one or more NDPs may be transmitted using a given time interval. For example, the time interval may be Short Inter-Frame Space (SIFS).

The time interval between sensing bursts may be SIFS (Short Inter-Frame Space), and other time intervals may be used. When other time intervals are used, a method for preventing use of the channel by other STAs (e.g., OBSS STAs) not participating in sensing may be used. For example, transmission of a control frame (e.g., CTS-to-itself, etc.) by an STA serving as a transmitter of a previous burst may be performed before the initiation of a new burst. For example, a control frame by a session initiator (group owner) may be transmitted before initiation of a new burst.

Responder STAs participating in transmission in each burst may be the same or different.

Figure 11:
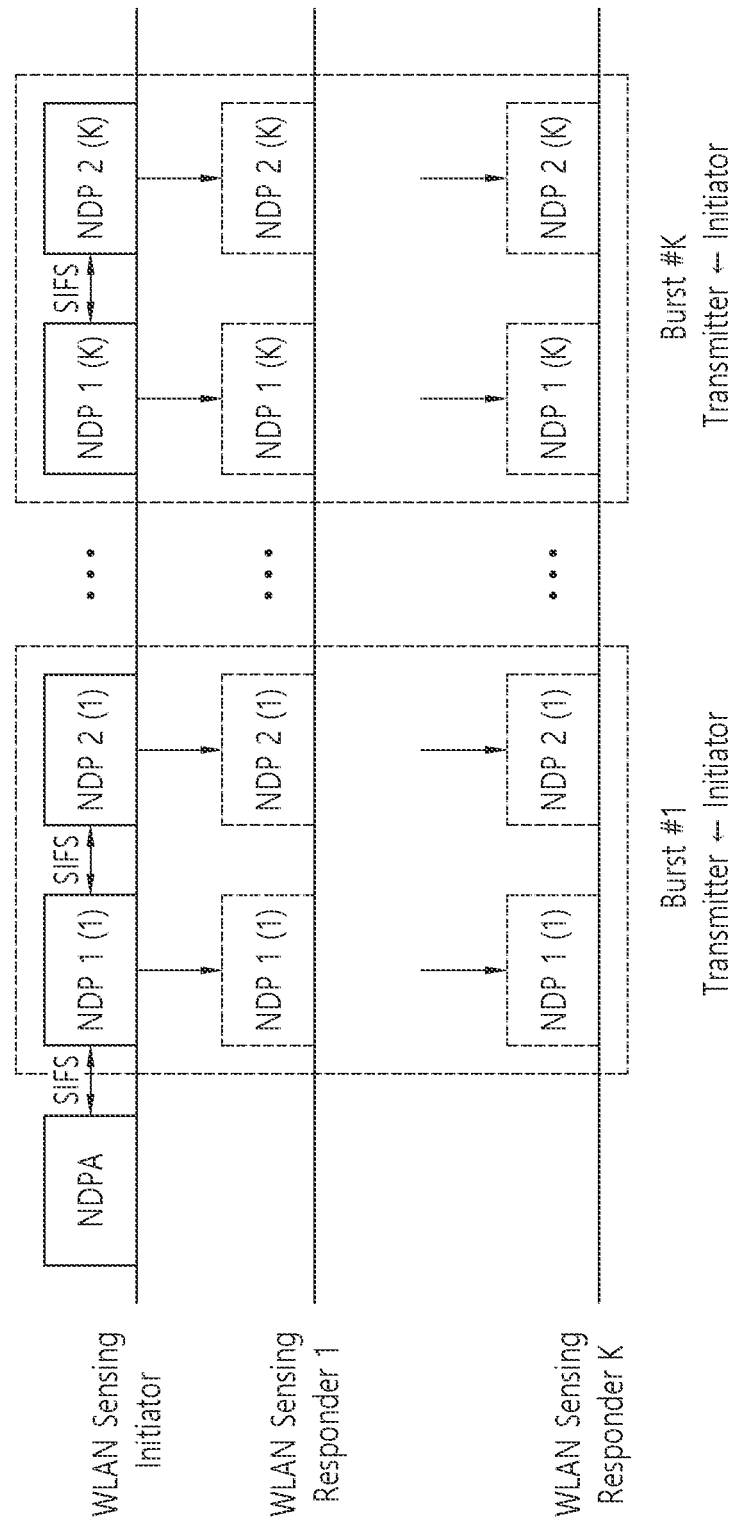
FIG. 11 is a diagram illustrating an embodiment of an initiator-based sensing method.

FIG. 11 is a diagram illustrating an embodiment of an initiator-based sensing method.

Referring to FIG. 11, in the initiator-based sensing method, the initiator may transmit a sounding signal (i.e., NDP).

In Initiator-based Sensing, the Initiator can send an NDP to the Responder(s). For example, K bursts may be included in one sensing session. For example, a burst may contain at least one NDP transmission. For example, the first burst may include transmission of NDP1(1) and NDP2(1). For example, the Kth burst may include transmission of NDP1(K) and NDP2(K).

The time interval between bursts can be SIFS, PIFS, DIFS or a newly defined time interval.

The transmitter (i.e., the terminal transmitting the NDP) may be different for each burst. Feedback can be performed within a burst. That is, the first burst may include transmission of the feedback frame 1 as well as transmission of NDP1(1) and NDP2(1).

Figure 12:
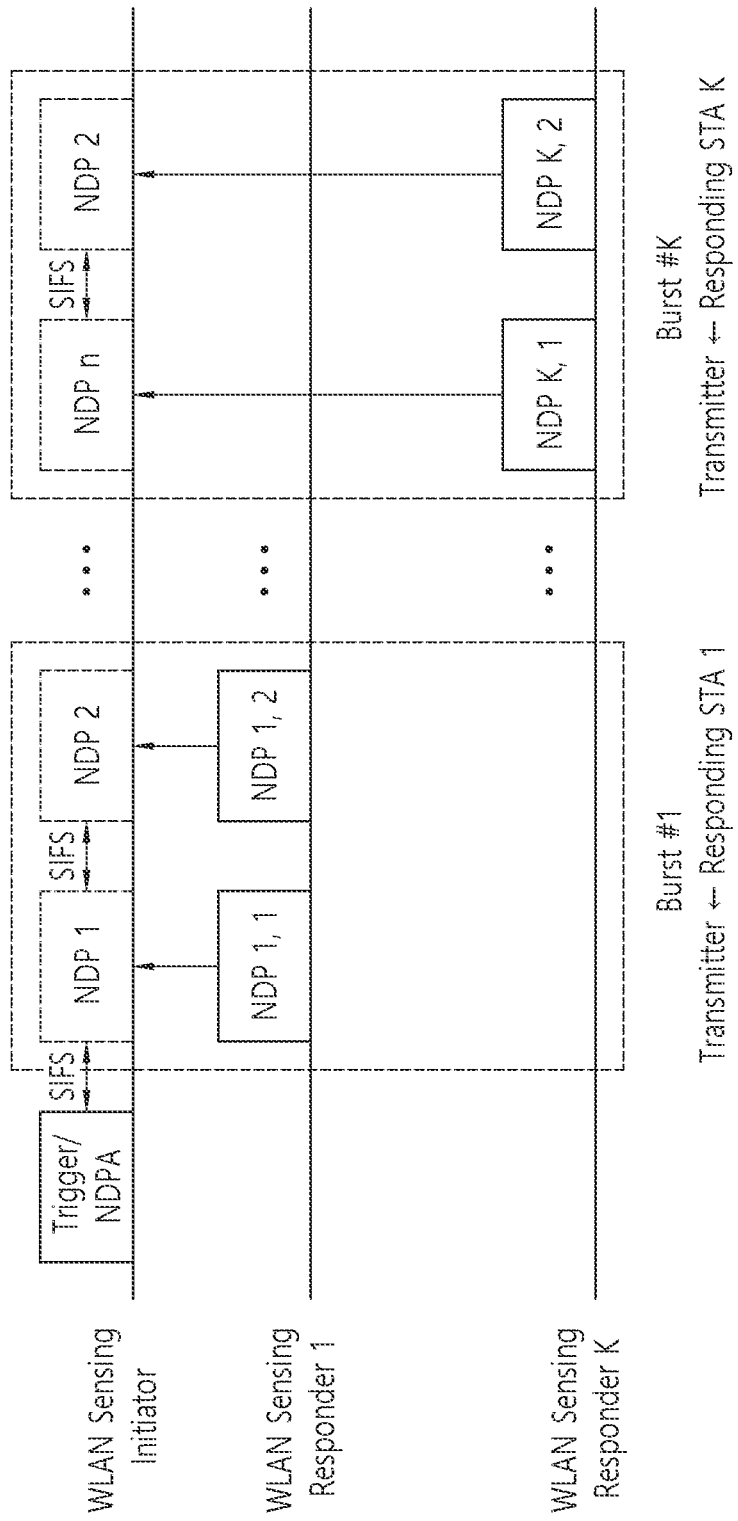
FIG. 12 is a diagram illustrating an embodiment of a responder-based sensing method.

FIG. 12 is a diagram illustrating an embodiment of a responder-based sensing method.

Referring to FIG. 12, in the responder-based sensing method, the responder may transmit a sounding signal (i.e., NDP).

In Responder-based Sensing, the Responder(s) can send an NDP to the Initiator. For example, K bursts may be included in one sensing session. For example, a burst may contain at least one NDP transmission. For example, the first burst may include transmission of NDP (1,1) and NDP (1,2). For example, the Kth burst may include transmission of NDP (K,1) and NDP (K,2).

For example, a transmitter transmitting NDP in the first burst may be WLAN Sensing responder 1, and a transmitter transmitting NDP in Kth burst may be WLAN Sensing responder K.

The time interval between bursts can be SIFS, PIFS, DIFS or a newly defined time interval.

Phase 3: Feedback Stage (Initiator-Based Sensing)

Responders acting as receivers during a sensing session can transmit feedback about the channel environment according to the number of base bands assigned by the initiator or selected by them.

For example, the sensing initiation frame (e.g., NDPA or trigger) frame transmitted by the initiator includes information that the wideband width to be measured is 80 MHz, the basic bandwidth is 20 MHz. and the measurement granularity is 4 subcarriers, and the STA 2 may include information on which the first and third 20 MHz of 80 MHz are allocated, and information on which the second and fourth 20 MHz basic bandwidths are allocated to STA 3.

In this case, WLAN Sensing responder 2 (i.e., STA 2) measures the channel environment of two bands in units of the first and third 20 MHz allocated among the 80 MHz broadband width with four subcarriers as one unit, and transmit related channel state information as feedback.

When measurement granularity information is absent in a sensing initiation frame (e.g., NDPA or Trigger frame), channel information may be fed back for each subcarrier.

In the absence of information on the basic bandwidth allocated to responders, the responders can list in order of the best channel environment, measure the channel state information for the two 20 MHz bands with the best channel environment as a unit of four subcarriers, and transmit the channel state information as feedback. That is, if allocation information for feeding back channel state information for a certain 20 MHz band among certain 80 MHz bands to the Responder is not transmitted, the responder may transmit a feedback frame including channel state information on two 20 MHz bands having the best channel state among 80 MHz bands. In this case, instruction information to use two 20 MHz channels may be included in the start information (i.e., the sensing initiation frame).

The WLAN Sensing initiator can collect channel information received from each WLAN Sensing responder and make a comprehensive decision on the channel environment. For example, the channel information may also include channel information between responders and may also include an indicator indicating the channel information.

Some of the channel information may be additionally used as redundant or discarded due to channel reciprocity.

For example, feedback can be transmitted after the end of every burst, after the end of every session, or requested by the initiator at a specific time.

Feedback may be requested from the STA acting as a transmitter to the STA(s) acting as a receiver for each burst. If the transmitter is the same for every burst, this feedback can be omitted.

After the end of each session or at a specific time, the initiator may request measurement results from STA(s) that acted as a transmitter in each burst.

In order to support such feedback, the feedback information can include a burst and an ID that can indicate a specific measurement within the burst.

Figure 13:
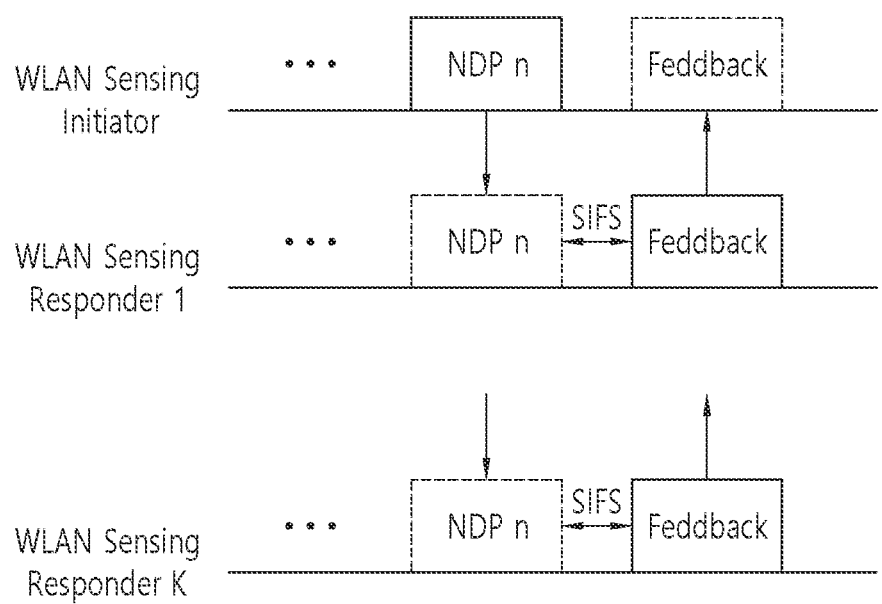
FIG. 13 is a diagram illustrating an embodiment of an initiator/transmitter-based sensing method.

FIG. 13 is a diagram illustrating an embodiment of an initiator/transmitter-based sensing method.

Referring to FIG. 13, a transmitter may not transmit a trigger frame. For example, a burst in a sensing session may include NDP transmission and feedback frame transmission. A WLAN sensing initiator may be a transmitter that transmits NDP, and WLAN sensing responders may be receivers that receive NDP. When receiving NDP, WLAN sensing responders may transmit a feedback frame after a specific time (e.g., SIFS).

In FIG. 13, the last NDP transmitted by the transmitter in one burst is the nth NDP (i.e., NDP n). That is, one burst may include n NDP transmissions.

For example, if the transmitter is the same in each burst, that is, if the same STA is the transmitter in all bursts, the feedback frame may be transmitted only at the end of the session. For example, one sensing session may include at least one burst, and one burst may include n number of NDP transmissions.

Figure 14:
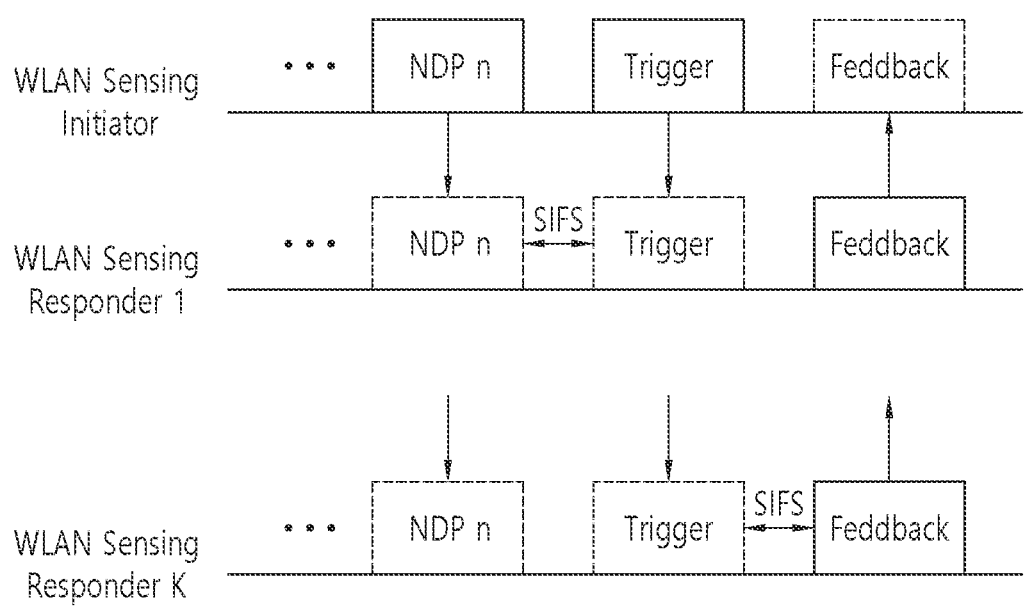
FIG. 14 is a diagram illustrating an embodiment of an initiator/transmitter-based sensing method.

FIG. 14 is a diagram illustrating an embodiment of an initiator/transmitter-based sensing method.

Referring to FIG. 14, the transmitter may transmit a trigger frame. For example, a burst in a sensing session may include NDP transmission, trigger frame transmission, and feedback frame transmission. A WLAN sensing initiator may be a transmitter that transmits NDP, and WLAN sensing responders may be receivers that receive NDP. When the trigger frame is received, the WLAN sensing responders may transmit a feedback frame based on the trigger frame.

In FIG. 14, the last NDP transmitted by the transmitter in one burst is the nth NDP (i.e., NDP n). That is, one burst may include n NDP transmissions.

For example, if the transmitter is the same in each burst, that is, if the same STA is the transmitter in all bursts, the feedback frame may be transmitted only at the end of the session. For example, one sensing session may include at least one burst, and one burst may include n number of NDP transmissions.

The Sounding & Feedback phases may be performed as many times as the number of bursts included in the group information.

When the number of bursts is less than the number of devices in the group, some devices may not play a role as transmitters. For example, assuming channel reciprocity, in the case of a group consisting of K STAs, channel environment information between all STAs can be obtained through (K−1) burst transmissions.

Information on bands allocated to WLAN Sensing responders for each burst may be different. For example, the same responder can perform sensing for the first and third 20 MHz of 80 MHz in the first burst, and can perform sensing for the second and fourth 20 MHz in the second burst.

Phase 4: Collection Stage

The initiator may receive feedback on channel measurement information from STAs acting as responders for each burst.

In order for the initiator to receive feedback after the session ends or at a specific time, the initiator can collect channel information obtained during sensing through triggering from devices that act as WLAN sensing transmitters in each burst to make a comprehensive judgment on the channel environment.

Channel information provided from each transmitter may be a result of sensing processed by the transmitter or may be information before processing on a channel (e.g., Channel Status Information (CSI)).

For example, each transmitter may provide an analysis result for human presence. For example, the transmitter may provide information related to whether a person exists between the transmitter and the receiver to the initiator.

The initiator can proceed with the request & response process to receive feedback at a specific time.

The initiator may simultaneously or sequentially process feedback from STAs that acted as transmitters in each burst.

Figure 15:
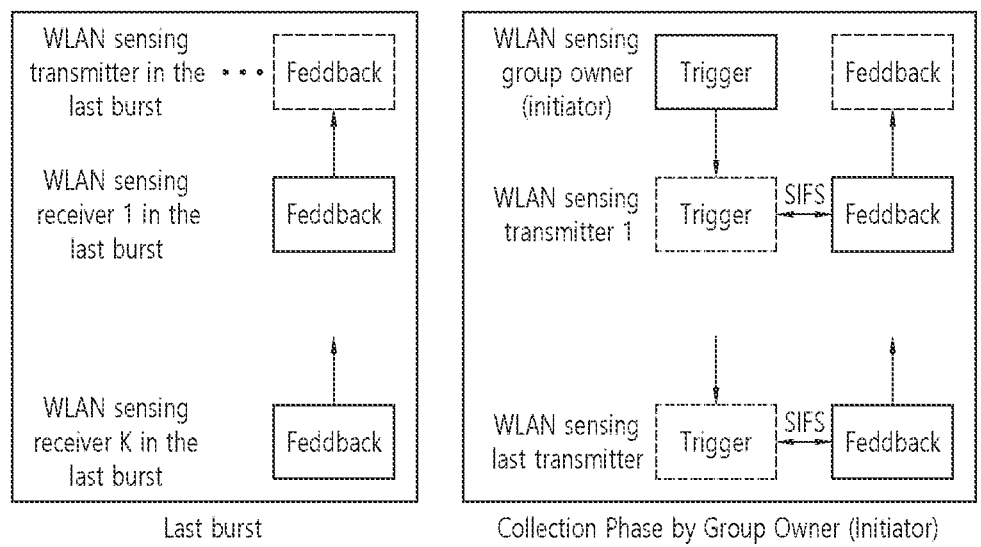
FIG. 15 is a diagram illustrating an embodiment of a sensing method.

FIG. 15 is a diagram illustrating an embodiment of a sensing method.

Referring to FIG. 15, after the last burst, the group owner (or initiator) may transmit a trigger frame to the transmitter of each burst. For example, one sensing session may include a plurality of bursts, and the transmitters of each burst may be different. When the last burst included in the sensing session ends, the initiator may transmit a trigger frame to transmitters of each burst and receive feedback from each transmitter. Feedback provided from each transmitter may be a result of sensing processed by the transmitter or may be information before processing on a channel (e.g., Channel Status Information (CSI)).

According to an example of the present specification, sensing is performed by cooperation of a plurality of devices, and accurate sensing results can be derived through additional information on a channel environment. In addition, by grouping WLAN sensing devices according to needs and situations, more accurate sensing can be performed while obtaining a reduction in overall power consumption. By controlling the granularity of the WLAN sensing responder's channel environment measurement, power consumption according to the measurement can be reduced. By controlling the degree of feedback according to the channel environment of the WLAN sensing responder, power consumption due to feedback can be reduced in an operating environment in which power consumption is a concern.

According to an example of the present specification, given power can be concentrated on measurement and feedback on an allocated bandwidth, enabling operation in a more expanded area. In addition, the sensing area can be enlarged by increasing the transmission power per unit frequency.

Embodiments of group-based WLAN sensing are described below.

For example, three STAs (STA1, STA2, and STA3) may be formed as a group. For example, STA1 may serve as an initiator, and STAs 2 and STA3 may serve as responders. For example, one session can consist of two bursts. During each burst duration, twice sensing signal (or sounding signal) transmission and feedback are defined. The role information, information on the number of bursts included in the session, information on the number of sounding signals in each burst, and information related to whether each burst includes feedback may be determined based on the capability exchanged during association with STA2 and STA, if STA1 is an AP, and may be determined through negotiation in the process of group formation.

The operation is explained by classifying it into Initiator-based Sensing and Responder-based Sensing.

Figure 16:
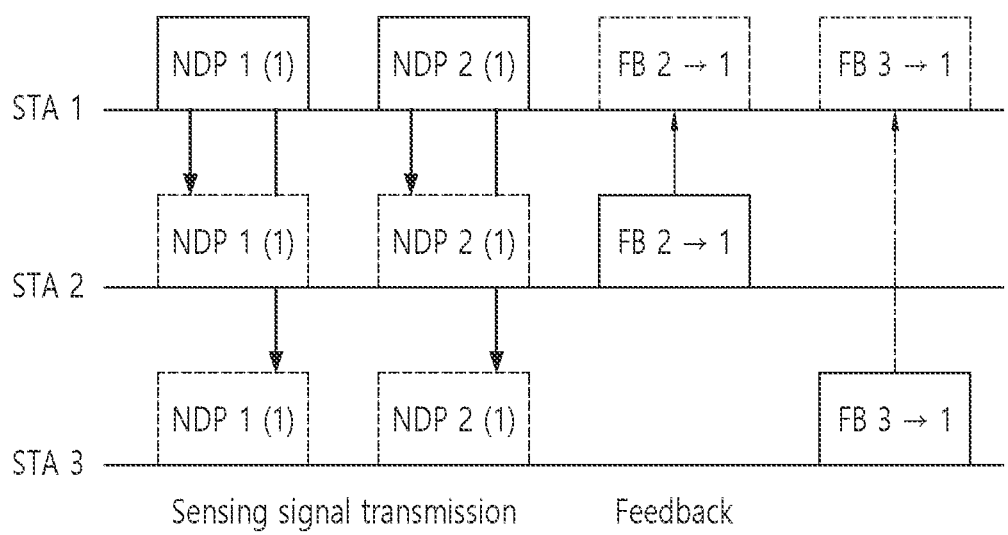
FIG. 16 and FIG. 17 are diagrams illustrating an embodiment of a sensing method based on an initiator/transmitter and a responder/transmitter, respectively.
Figure 16:
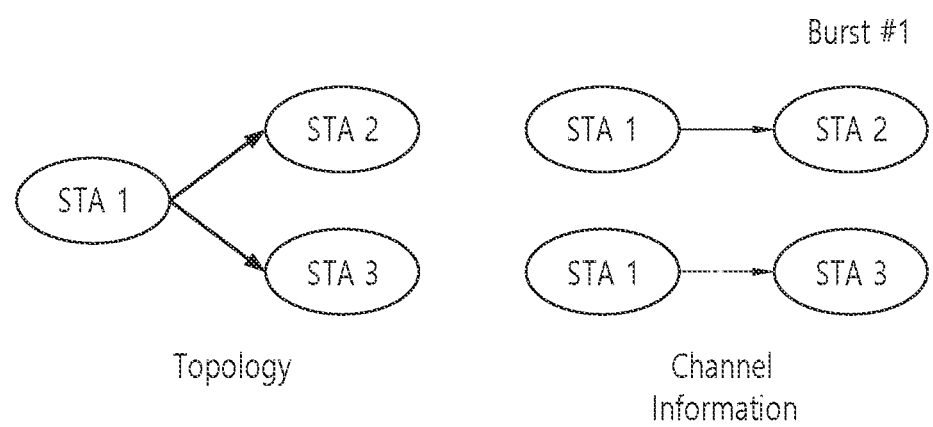
Figure 17:
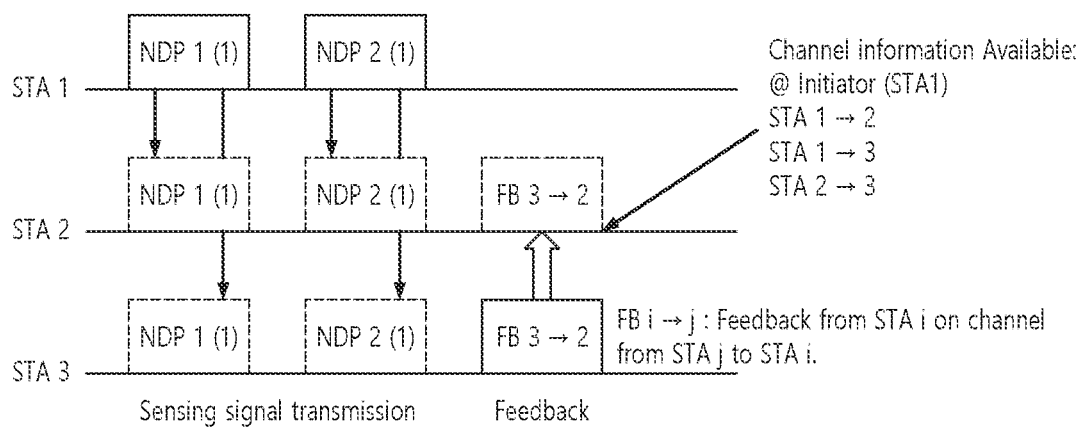
Figure 17:
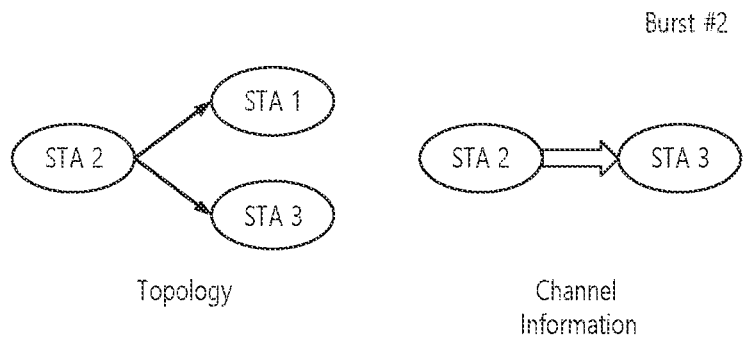

FIG. 16 and FIG. 17 are diagrams illustrating an embodiment of an initiator/transmitter-based sensing method. FIG. 16 is a diagram related to a first burst, and FIG. 17 is a diagram related to a second burst. STA1 may be an initiator, and STA2 and STA3 may be responders.

Referring to FIG. 16, STA1 is a transmitter that transmits a sounding signal to STA2 and STA3. STA2 may transmit channel information from STA1 to STA2 to STA1 as feedback, and STA3 may transmit channel information from STA1 to STA3 to STA1 as feedback.

Referring to FIG. 17, STA2 is a transmitter that transmits a sounding signal to STA1 and STA3. STA3 may transmit channel information from STA2 to STA3 to STA1 (i.e., initiator) as feedback.

Accordingly. STA1, which is an initiator, may obtain channel information between STA1 and STA2, channel information between STA1 and STA3, and channel information between STA2 and STA3.

Figure 18:
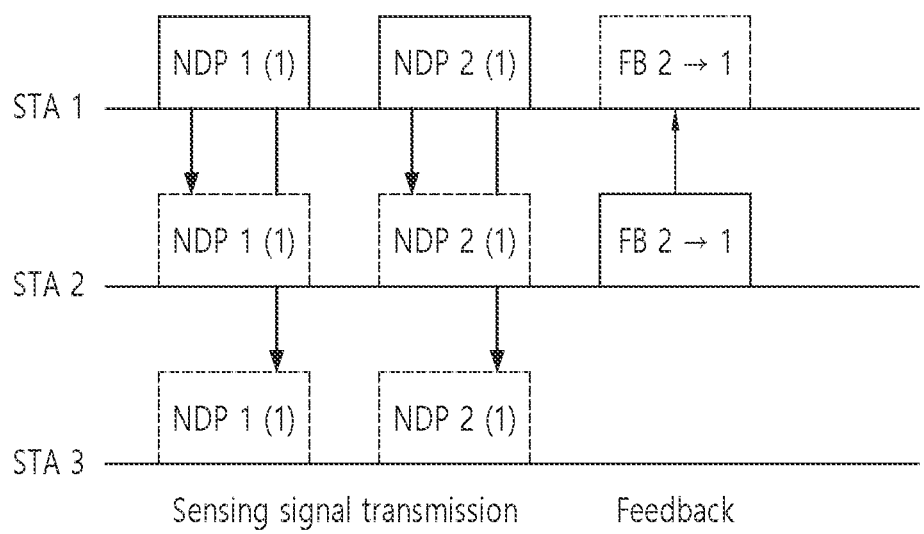
FIG. 18 and FIG. 19 are diagrams illustrating an embodiment of a sensing method based on an initiator/transmitter and a responder/transmitter, respectively.
Figure 18:
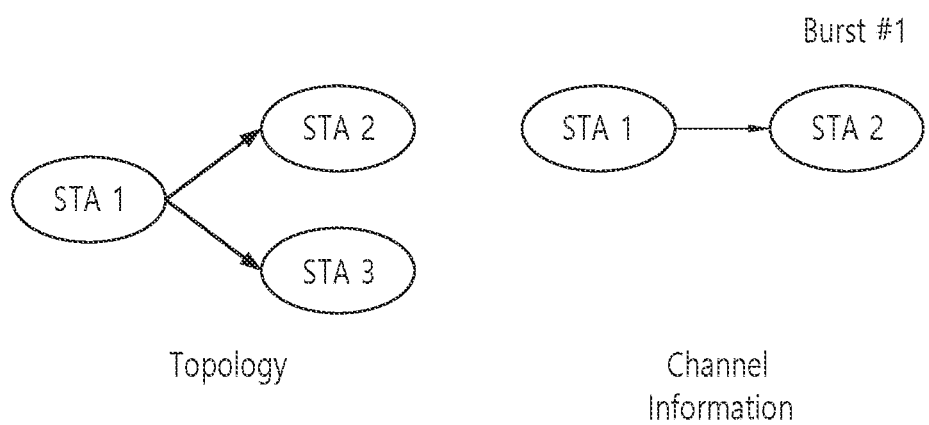
Figure 19:
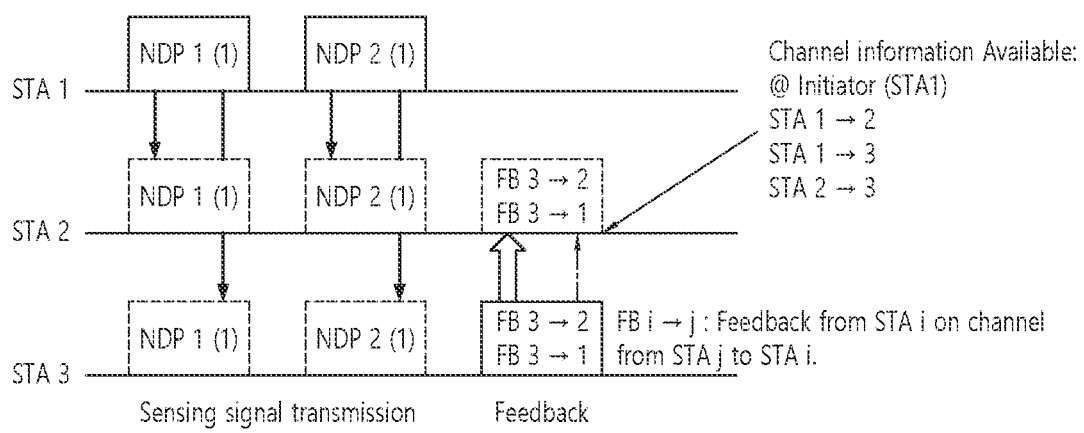
Figure 19:
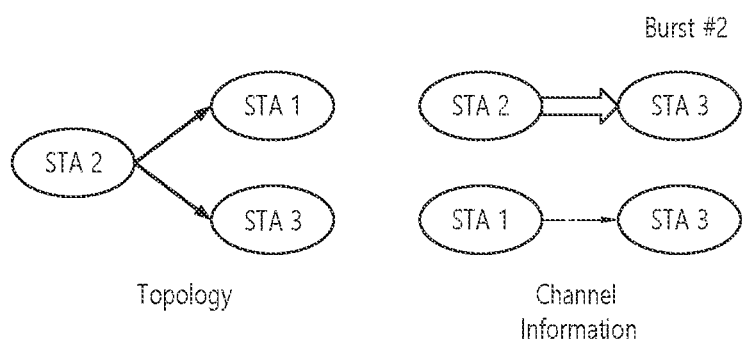

FIG. 18 and FIG. 19 are diagrams illustrating an embodiment of an initiator/transmitter-based sensing method. FIG. 18 is a diagram related to a first burst, and FIG. 19 is a diagram related to a second burst. STA1 may be an initiator, and STA2 and STA3 may be responders.

Referring to FIG. 18, STA1 is a transmitter that transmits a sounding signal to STA2 and STA3. STA2 may transmit channel information from STA1 to STA2 to STA1 as feedback.

Referring to FIG. 19, STA2 is a transmitter that transmits a sounding signal to STA1 and STA3. STA3 may transmit channel information from STA1 to STA3 and channel information from STA2 to STA3 to STA1 (i.e., initiator) as feedback.

Accordingly, STA1, which is an initiator, may obtain channel information between STA1 and STA2, channel information between STA1 and STA3, and channel information between STA2 and STA3.

Figure 20:
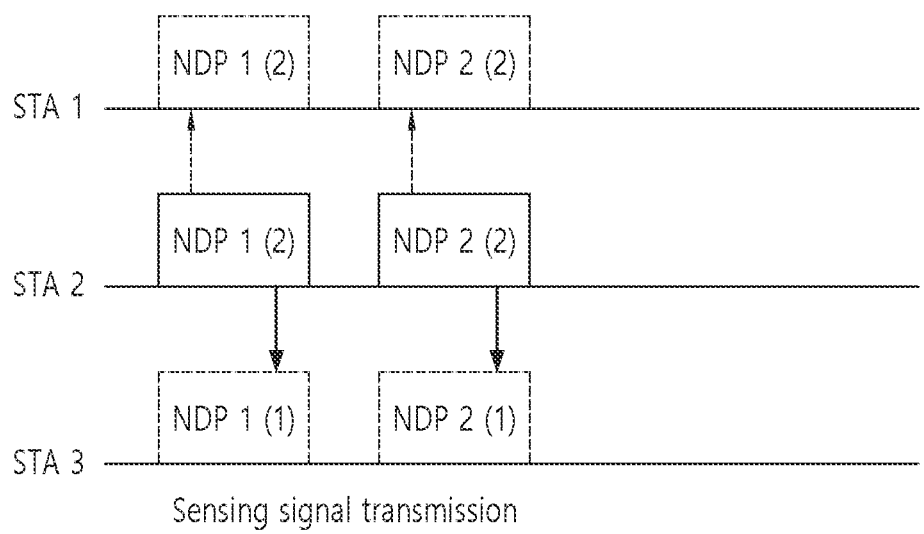
FIG. 20 to FIG. 21 are diagrams illustrating an embodiment of a responder/transmitter-based sensing method.
Figure 20:
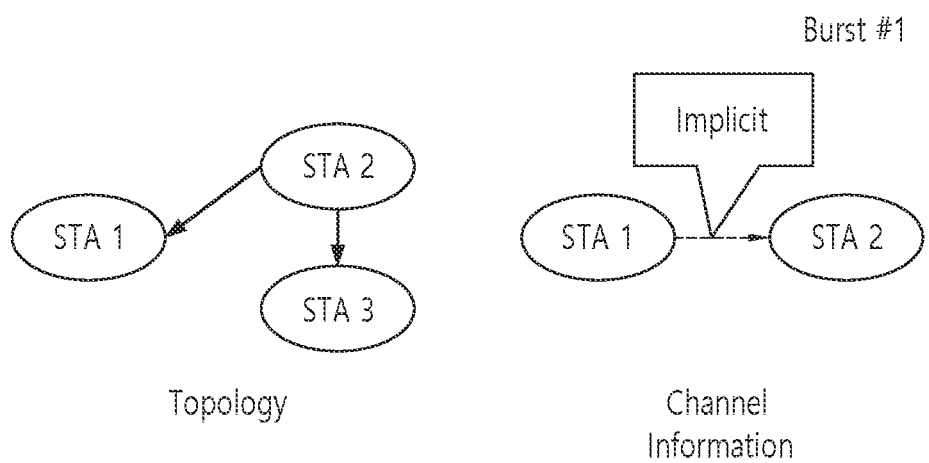
Figure 21:
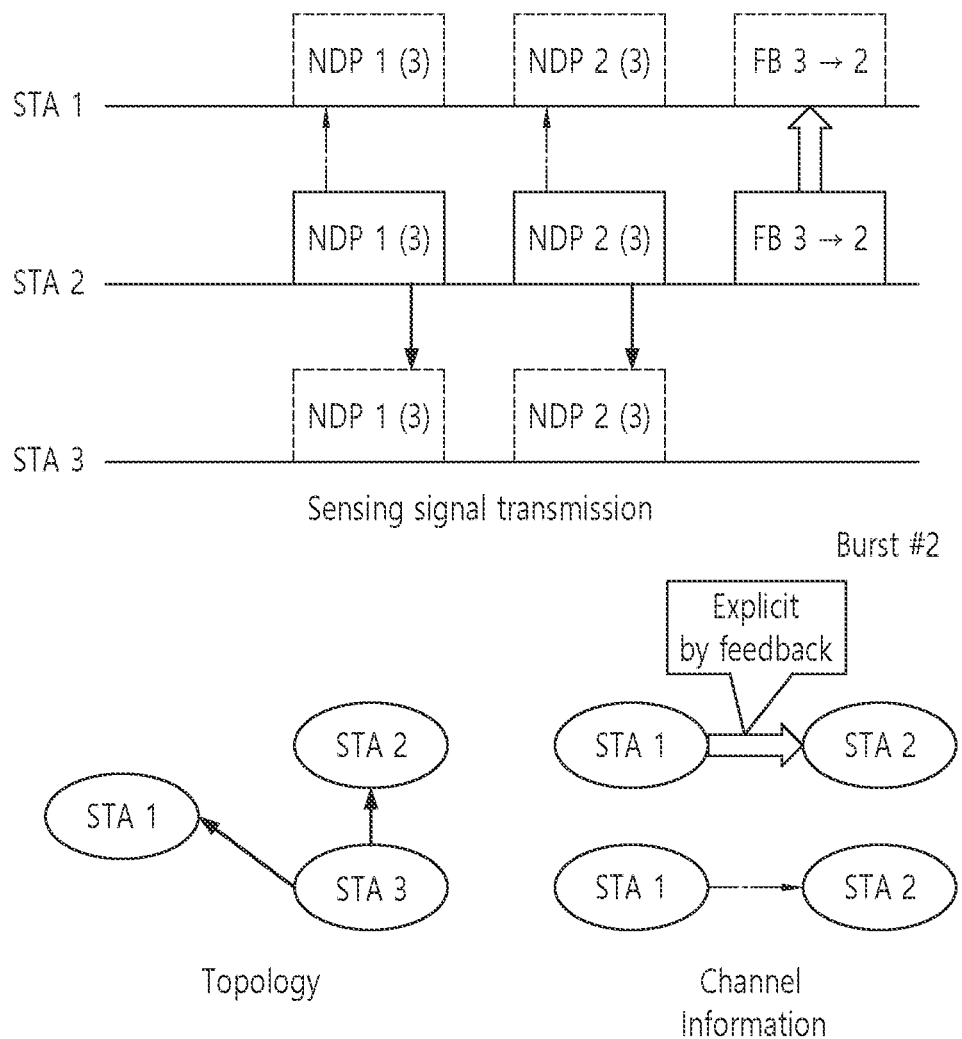

FIG. 20 to FIG. 21 are diagrams illustrating an embodiment of a responder/transmitter-based sensing method. FIG. 20 is a diagram related to a first burst, and FIG. 21 is a diagram related to a second burst. STA1 may be an initiator, and STA2 and STA3 may be responders.

Referring to FIG. 20, STA2 is a transmitter that transmits a sounding signal to STA1 and STA3. STA1 may receive sounding signals (i.e., NDP1 and NDP2) from STA2, and may obtain channel information from STA2 to STA1 based on the received NDP.

Referring to FIG. 21. STA3 is a transmitter that transmits a sounding signal to STA1 and STA2. STA1 may receive sounding signals (i.e., NDP1 and NDP2) from STA3, and may obtain channel information from STA3 to STA1 based on the received NDP. STA3 may transmit channel information from STA2 to STA3 (e.g., information acquired by receiving NDP from STA2 in the first burst) as feedback.

Accordingly, STA1, which is an initiator, may obtain channel information between STA1 and STA2, channel information between STA1 and STA3, and channel information between STA2 and STA3.

Figure 22:
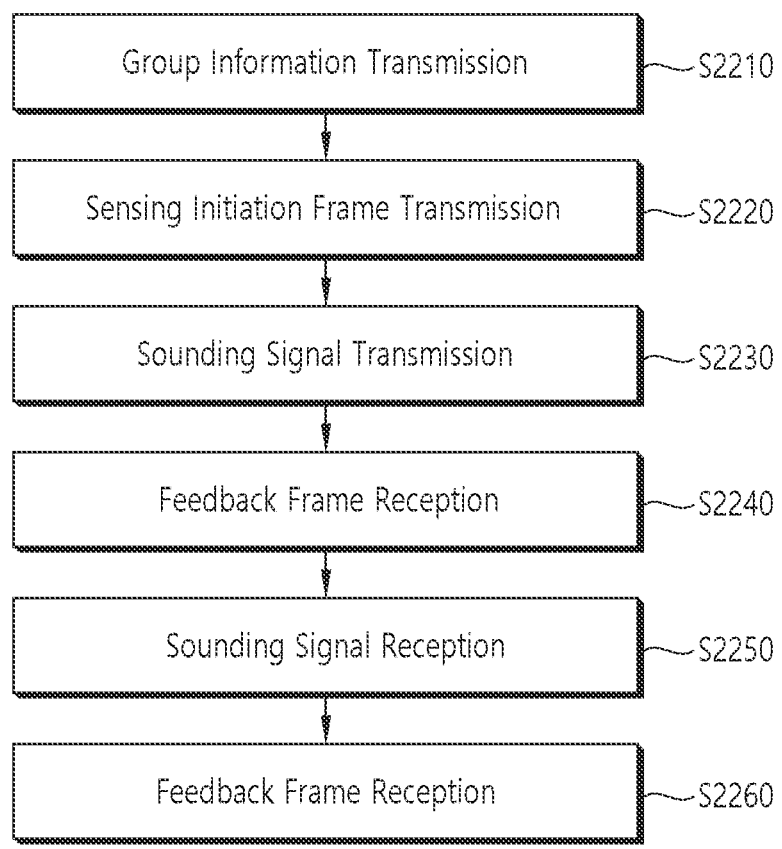
FIG. 22 is a diagram illustrating an embodiment of a method of operating a transmitting STA.

FIG. 22 is a diagram illustrating an embodiment of a method of operating a transmitting STA.

Referring to FIG. 22, a receiving STA operation may be based on technical features described in at least one of FIG. 1 to FIG. 21.

A sensing session may include a first burst and a second burst.

The transmitting STA may transmit group information (S2210). For example, the transmitting STA may transmit group information, and the group information may include information related to start time and end time of the sensing session, the number of bursts included in the sensing session, and the number of sounding signals transmitted in the first burst. The group information may include ID (e.g., AID, MAC Address, or newly defined ID) information of initiators and responders. Group information may include information about the transmitter of each burst. That is, The group information includes information related to start and end times of the sensing session, the number of bursts included in the sensing session, identifiers (IDs) of STAs participating in sensing, and STAs transmitting sounding signals in each burst: and information related to the number of sounding signals transmitted in the first burst.

The transmitting STA may transmit a sensing initiation frame (S2220). For example, the sensing session may further include transmission of a sensing initiation frame by the transmitting STA, and the sensing initiation frame may further include frequency band allocation information for the first and second feedback frames. The sensing initiation frame may include information about the transmitter of each burst.

The transmitting STA may transmit a sounding signal (S2230). For example, the transmitting STA may transmit a first sounding signal to a first receiving STA and a second receiving STA in the first burst.

The transmitting STA may receive the feedback frame (S2240). For example, the transmitting STA may receive a first feedback frame including first channel information between the transmitting STA and the first receiving STA from the first receiving STA in the first burst, and may receive a second feedback frame including channel information between the transmitting STA and the second receiving STA from the second receiving STA.

The transmitting STA may receive a sounding signal (S2250). For example, the transmitting STA may receive the second sounding signal from the first receiving STA in the second burst.

The transmitting STA may receive the feedback frame (S2260). For example, the transmitting STA may receive a third feedback frame including channel information between the first receiving STA and the second receiving STA from the second receiving STA in the second burst.

For example, the sensing initiation frame may include a null data packet announcement (NDPA) frame, and the first and second sounding signals may include a null data packet (NDP) frame.

For example, the sensing session may further include a third burst, and the transmitting STA may receive a third sounding signal from the second receiving STA in the third burst.

For example, the first sounding signal may include a plurality of null data packet (NDP) frames.

For example, in the first burst, the transmitting STA may obtain a transport channel through contention, and in the second burst, the first receiving STA may obtain a transport channel through contention.

Figure 23:
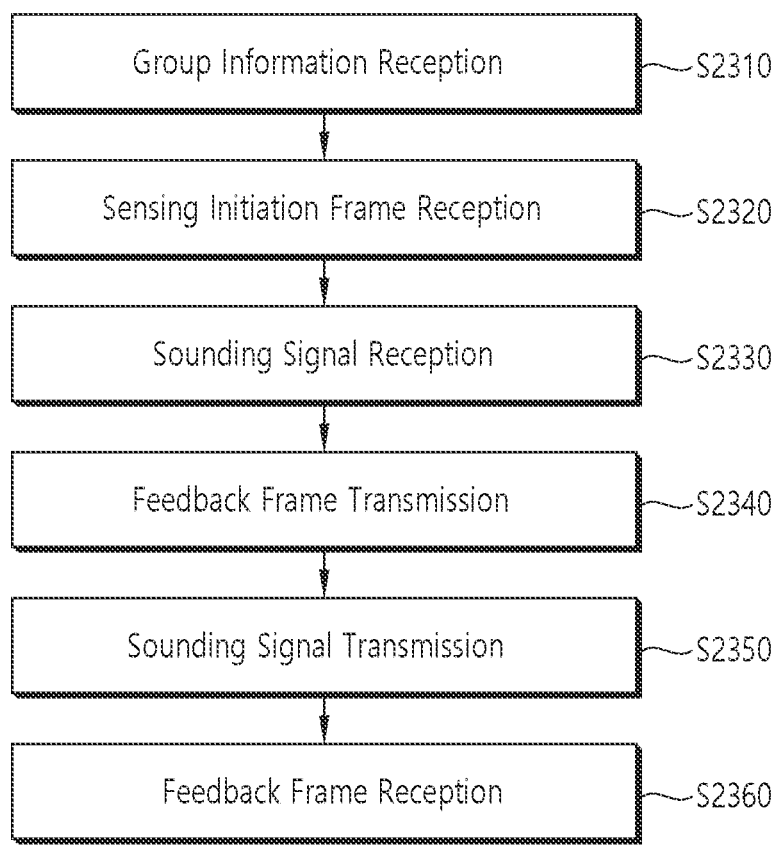
FIG. 23 is a diagram illustrating an embodiment of a method of operating a first receiving STA.

FIG. 23 is a diagram illustrating an embodiment of a method of operating a first receiving STA.

Referring to FIG. 23, a first receiving STA operation may be based on technical features described in at least one of FIG. 1 to FIG. 21.

The first receiving STA may receive group information (S2310). For example, a first receiving STA may receive group information, and the group information may include information related to start time and end time of the sensing session, the number of bursts included in the sensing session, and the number of sounding signals transmitted in the first burst. The group information may include ID (e.g., AID, MAC Address, or newly defined ID) information of initiators and responders. Group information may include information about the transmitter of each burst. That is, The group information includes information related to start and end times of the sensing session, the number of bursts included in the sensing session, identifiers (IDs) of STAs participating in sensing, and STAs transmitting sounding signals in each burst; and information related to the number of sounding signals transmitted in the first burst.

The first receiving STA may receive the sensing initiation frame (S2320). For example, the sensing session may further include transmission of a sensing initiation frame by the transmitting STA, and the sensing initiation frame may further include frequency band allocation information for the first and second feedback frames. The sensing initiation frame may include information about the transmitter of each burst.

The first receiving STA may receive a sounding signal (S2330). For example, a first receiving STA may receive a first sounding signal from the transmitting STA in the first burst.

The first receiving STA may transmit a feedback frame (S2340). For example, the first receiving STA may transmit a first feedback frame including first channel information between the transmitting STA and the first receiving STA to the transmitting STA in the first burst.

The first receiving STA may transmit a sounding signal (S2350). For example, the first receiving STA may receive the second sounding signal from the first receiving STA in the second burst.

The first receiving STA may receive the feedback frame (52360). For example, the first receiving STA may receive a second feedback frame including channel information between the first receiving STA and the second receiving STA from the second receiving STA in the second burst, and may receive a third feedback frame including channel information between the transmitting STA and the first receiving STA from the transmitting STA.

For example, the sensing initiation frame may include a null data packet announcement (NDPA) frame, and the first and second sounding signals may include a null data packet (NDP) frame.

For example, the sensing session may further include a third burst, and the transmitting STA may receive a third sounding signal from the second receiving STA in the third burst.

For example, the first sounding signal may include a plurality of null data packet (NDP) frames.

For example, in the first burst, the transmitting STA may obtain a transport channel through contention, and in the second burst, the first receiving STA may obtain a transport channel through contention.

Some of the detailed steps shown in the examples of FIGS. 22 and 23 may not be essential steps and may be omitted. In addition to the steps shown in FIGS. 22 and 23, other steps may be added, and the order of the steps may be changed. Some of the above steps may have their own separate technical meaning.

The technical features of the present specification described above may be applied to various devices and methods. For example, the technical features of the present specification described above may be performed/supported through the device of FIGS. 1 and/or 9. For example, the technical features of the present specification described above may be applied only to a part of FIGS. 1 and/or 9. For example, the technical features of the present specification described above are implemented based on the processing chips 114 and 124 of FIG. 1, implemented based on the processors 111 and 121 and the memories 112 and 122 of FIG. 1, or may be implemented based on the processor 910 and the memory 920 of FIG. 9. For example, in the device of the present specification, the device includes a memory: and a processor operatively coupled to the memory, wherein the processor is adapted to: transmit a first sounding signal to a first receiving STA and a second receiving STA in a first burst, wherein sensing session includes the first burst and a second burst; receive a first feedback frame including first channel information between the transmitting STA and the first receiving STA from the first receiving STA in the first burst, and receiving a second feedback frame including channel information between the transmitting STA and the second receiving STA from the second receiving STA; receive a second sounding signal from the first receiving STA in the second burst; and receive a third feedback frame including channel information between the first receiving STA and the second receiving STA from the second receiving STA in the second burst.

Technical features of the present specification may be implemented based on a computer readable medium (CRM). For example, the CRM proposed by the present specification stores instructions that, based on being executed by at least one processor of a transmitting station (STA) of a Wireless Local Area Network system, perform operations comprising: transmitting, by the transmitting STA, a first sounding signal to a first receiving STA and a second receiving STA in a first burst, w % herein sensing session includes the first burst and a second burst: receiving a first feedback frame including first channel information between the transmitting STA and the first receiving STA from the first receiving STA in the first burst, and receiving a second feedback frame including channel information between the transmitting STA and the second receiving STA from the second receiving STA; receiving a second sounding signal from the first receiving STA in the second burst: and receiving a third feedback frame including channel information between the first receiving STA and the second receiving STA from the second receiving STA in the second burst.

Instructions stored in the CRM of the present specification may be executed by at least one processor. At least one processor related to the CRM of the present specification may be the processors 111 and 121 or the processing chips 114 and 124 of FIG. 1 or the processor 910 of FIG. 9. Meanwhile, the CRM of present specification may be the memories 112 and 122 of FIG. 1, the memory 920 of FIG. 9, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a transmitting station (STA) in a wireless local area network (WLAN) system, the method comprising:
   transmitting, by the transmitting STA, a first sounding signal to a first receiving STA and a second receiving STA in a first burst, wherein sensing session includes the first burst and a second burst;
   receiving a first feedback frame including first channel information between the transmitting STA and the first receiving STA from the first receiving STA in the first burst, and receiving a second feedback frame including channel information between the transmitting STA and the second receiving STA from the second receiving STA;
   receiving a second sounding signal from the first receiving STA in the second burst; and
   receiving a third feedback frame including channel information between the first receiving STA and the second receiving STA from the second receiving STA in the second burst.

2. The method of claim 1, further comprising:
   transmitting group information by the transmitting STA;
   wherein the group information includes information related to start time of the sensing session, end time of the sensing session, a number of bursts included in the sensing session, identifiers (ID) of STAs participating in sensing, and STAs transmitting a sounding signal in each burst, and information related to a number of sounding signals transmitted in the first burst.

3. The method of claim 1, wherein the sensing session further includes transmission of a sensing initiation frame by the transmitting STA,
   wherein the sensing initiation frame further includes frequency band allocation information for the first and second feedback frames.

4. The method of claim 3, wherein the sensing initiation frame includes a null data packet announcement (NDPA) frame, and the first and second sounding signals include a null data packet (NDP) frame.

5. The method of claim 1, further comprising:
   receiving, by the transmitting STA, a third sounding signal from the second receiving STA in a third burst, wherein the sensing session further includes the third burst.

6. The method of claim 1, wherein the first sounding signal includes a plurality of null data packet (NDP) frames.

7. The method of claim 1, wherein the transmitting STA obtains a transport channel through contention in the first burst,
   wherein the first receiving STA obtains a transport channel through contention in the second burst.

8. A transmitting station (STA) in a wireless local area network (WLAN) system, the transmitting STA comprising:
   a transceiver transmitting and/or receiving a wireless signal; and
   a processor coupled to the transceiver,
   wherein the processor is configured to:
   transmit a first sounding signal to a first receiving STA and a second receiving STA in a first burst, wherein sensing session includes the first burst and a second burst;
   receive a first feedback frame including first channel information between the transmitting STA and the first receiving STA from the first receiving STA in the first burst, and receiving a second feedback frame including channel information between the transmitting STA and the second receiving STA from the second receiving STA;
   receive a second sounding signal from the first receiving STA in the second burst; and
   receive a third feedback frame including channel information between the first receiving STA and the second receiving STA from the second receiving STA in the second burst.

9. The transmitting STA of claim 8, wherein the processor is further adapted to
   transmit group information by the transmitting STA;
   wherein the group information includes information related to start time of the sensing session, end time of the sensing session, a number of bursts included in the sensing session, identifiers (ID) of STAs participating in sensing, and STAs transmitting a sounding signal in each burst, and information related to a number of sounding signals transmitted in the first burst.

10. The transmitting STA of claim 8, wherein the sensing session further includes transmission of a sensing initiation frame by the transmitting STA,
    wherein the sensing initiation frame further includes frequency band allocation information for the first and second feedback frames.

11. The transmitting STA of claim 10, wherein the sensing initiation frame includes a null data packet announcement (NDPA) frame, and the first and second sounding signals include a null data packet (NDP) frame.

12. The transmitting STA of claim 8, wherein the processor is further adapted to:
receive a third sounding signal from the second receiving STA in a third burst, wherein the sensing session further includes the third burst.

13. The transmitting STA of claim 8, wherein the first sounding signal includes a plurality of null data packet (NDP) frames.

14. The transmitting STA of claim 8, wherein the transmitting STA obtains a transport channel through contention in the first burst,
wherein the first receiving STA obtains a transport channel through contention in the second burst.

15. A first receiving station (STA) in a wireless local area network (WLAN) system, comprising:
a transceiver transmitting and/or receiving a wireless signal; and
a processor coupled to the transceiver,
wherein the processor is configured to:
receive a first sounding signal from a transmitting STA in a first burst, wherein sensing session includes the first burst and a second burst;
transmit a first feedback frame including first channel information between the transmitting STA and the first receiving STA to the transmitting STA in the first burst;
transmit a second sounding signal to the transmitting STA and a second receiving STA in the second burst; and
receive a second feedback frame including channel information between the transmitting STA and the first receiving STA from the transmitting STA in the second burst, receive a third feedback frame including channel information between the first receiving STA and the second receiving STA from the second receiving STA.

* * * * *